United States Patent [19]
Suzuki

[11] Patent Number: 5,249,615
[45] Date of Patent: Oct. 5, 1993

[54] TWO ZONE TREAD PATTERN

[76] Inventor: Toshimi Suzuki, 355-43 Oowadashinden, Yachiyo-shi Chiba-ken, Japan

[21] Appl. No.: 754,187

[22] Filed: Aug. 28, 1991

Related U.S. Application Data

[63] Continuation of Ser. No. 335,668, Mar. 27, 1989, abandoned.

[51] Int. Cl.⁵ .............................................. B60C 11/04
[52] U.S. Cl. .................................. 152/209 B; 152/185
[58] Field of Search ............ 152/209 R, 209 B, 209 D, 152/173, 176, 178, 185, 188, 190, 187

[56] References Cited

U.S. PATENT DOCUMENTS

| | | | |
|---|---|---|---|
| 1,147,149 | 7/1915 | Dunbar | 152/209 R |
| 2,120,063 | 6/1938 | Bourdon | 152/209 R |
| 2,240,542 | 5/1941 | Bourdon | 152/209 R |
| 2,267,406 | 12/1941 | Krusemark | 152/208 R |
| 3,001,568 | 9/1961 | Suominen | 152/209 R |
| 3,861,436 | 1/1975 | Doque | 152/209 R |
| 4,071,068 | 1/1978 | Olsen | 152/176 |
| 4,267,872 | 5/1981 | Kamiya | 152/209 R |

FOREIGN PATENT DOCUMENTS

| | | |
|---|---|---|
| 17207 | 7/1969 | Japan . |
| 60408 | 5/1974 | Japan . |
| 41 | 1/1975 | Japan . |
| 83106 | 6/1984 | Japan . |
| 81206 | 4/1986 | Japan . |
| 241207 | 10/1988 | Japan . |

*Primary Examiner*—Geoffrey L. Knable
*Attorney, Agent, or Firm*—Lorusso & Loud

[57] ABSTRACT

The present invention provides a novel tread for a tire or anti-skid armor mounted on a tire. The tread has a central, circumferentially extending anti-skid zone, transverse tread members transverse to the anti-skid zone and driving tread members arranged in circumferentially extending driving zones on each side of the anti-skid zone. The anti-skid zone has a central circumferentially extending hollow or depression divided by transverse tread members to form a plurality of cavities each having a volume larger than one of the transverse tread members in the anti-skid zone. At least one elongated lug is associated with a transverse tread member, the lug being in close proximity to, parallel to and narrower than the associated transverse tread member. Each elongated lug protrudes radially beyond the associated transverse tread member.

9 Claims, 21 Drawing Sheets

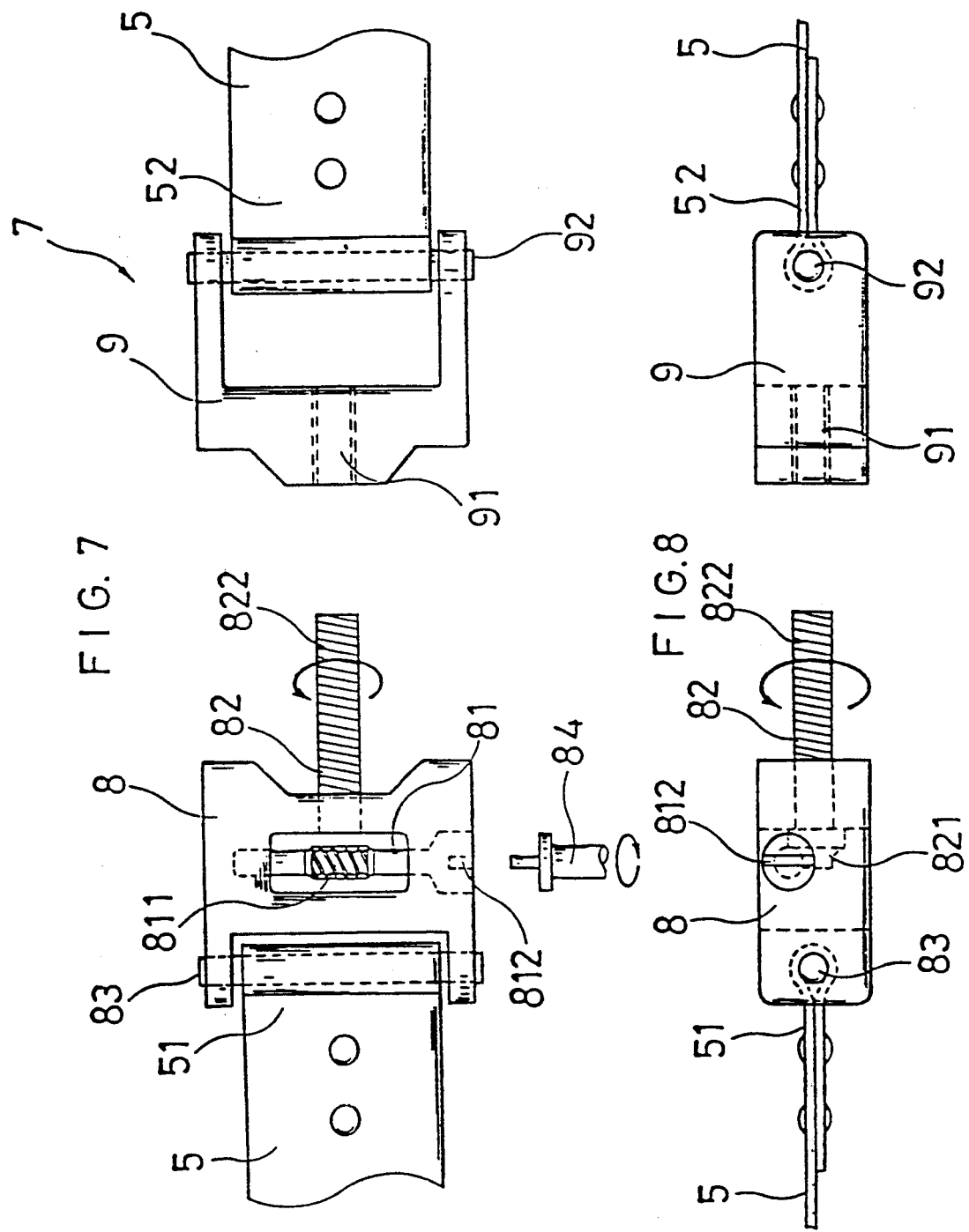

TWO ZONE TREAD PATTERN

This application is a continuation of application Ser. No. 07/335,668, filed Mar. 27, 1989, now abandoned.

BACKGROUND OF THE INVENTION

This invention relates to a tread formed on a vehicle tire or anti-skid armor adapted to be secured around a vehicle tire.

This invention also relates to anti-skid armor which enables a safe drive on normal roads as well as under adverse conditions wherein a drive with normally equipped tires would be difficult, particularly on snow, mud, sand and gravel.

Tire chains, studded or spike tires, and snow tires have been used for traveling on snow and ice for anti-skidding purposes, although they have various drawbacks.

On normal paved roads, tire chains cause a high noise level and do not provide a comfortable ride. Further chains are susceptible to becoming disengaged and breaking.

Therefore, the tire chains can be employed only in low-speed driving for a short distance.

Tire chains also require considerable labor to cope with changing road conditions; that is, tire chains should be put on and taken off every time when snow or bare pavement is encountered on a road.

Studded tires can be used on normal roads although they have a defect that the studs embedded therein cause serious damage to the pavement and consequent dust pollution.

Snow tires run on both snow and normal roads, although their anti-skid effect is not comparable to that of studded tires. Particularly, their poor ice and packed snow traction results in a longer breaking distance causing safety problems.

Recently, tire chains have often been replaced by rubber and resin nets adapted to be secured over the tire treads. These nets induce neither violent vibration nor noise during travel on normal roads although they are inherently susceptible to breakage. For example, a passenger car having anti-skid nets of a synthetic rubber mounted on its driving wheels can travel only 50 to 80 kilometers on asphalt pavement, at an average speed of 40 kilometers per hour.

SUMMARY OF THE INVENTION

It is therefore, an object of the present invention to provide a tread pattern, formed on a tire or an anti-skid device (armor), having high traction and thereby preventing skidding while providing a safe, comfortable drive on snow, muddy roads, packed or icy snow as well as on normal roads.

The foregoing object is accomplished by providing a tread pattern on a tire or anti-skid device without studs or the like.

The anti-skid device of the present invention is a rectangular rubber belt mounted on a tire which has one of the tread patterns according to the present invention. An anti-skid device with a tread pattern in accordance with the present invention provides high durability and good long-driving performance.

Another object of the present invention is to provide a novel anti-skid device which can be secured over a tire.

Another object of the present invention is to provide an anti-skid device which enables a safe, comfortable drive on normal roads as well as in adverse conditions wherein a drive with normally equipped tires is difficult, as on snow, mud, sand and gravel.

Still another object of the present invention is to provide an anti-skid device which saves labor of putting on or taking off an anti-skid device to cope with a change in road conditions.

Still another object of the present invention is to provide an anti-skid device having an improved durability.

Other objects will in part be obvious and will in part appear hereinafter.

According to one aspect of the invention, there is provided an anti-skid device adapted to be secured over a tire tread of a vehicle including:

a rubber laminate of at least one rectangular rubber layer, having a tread pattern on its front surface and a flexible back surface for allowing close contact of the anti-skid device with the tire tread;

at least two fastening belts embedded in the rubber laminate extending substantially parallel to each other along the circumference of the anti-skid device;

a plurality of securing members extending substantially perpendicular to the fastening belts and disposed at regular intervals along the fastening belts;

the securing members including lips at opposite sides protruding out of the rubber laminate to allow the tire to be secured on opposite sides;

a pair of coupling means for connecting the ends of the fastening belts and tightening the fastening belts so that the flexible surface is brought into close contact with the tire tread; and a fastening means for pulling the lips inwardly toward the rotational axis of the tire.

According to another aspect of the invention, there is provided an anti-skid device adapted to be secured over a tire tread of a vehicle including:

a rubber laminate of at least one rectangular rubber layer having a tread pattern on its front surface and a flexible back surface for allowing close contact of the anti-skid device with said tire tread;

at least two fastening belts embedded in the rubber laminate extending substantially parallel to each other along the longitudinal axis of the anti-skid device;

a plurality of securing members extending substantially perpendicular to the fastening belts disposed at regular intervals along the fastening belts;

the securing member including lips at opposite ends protruding out of the rubber laminate to hold the tire on opposite sides;

a reinforcing member;

a pair of coupling means for connecting the ends of the fastening belts and tightening the fastening belts so that said flexible surface is brought into close contact with the tire tread; and a fastening means for pulling the lips inwardly toward the rotational axis of the tire.

In the present invention, the reinforcing member is preferably a network of fibers.

The rubber laminate preferably includes a plurality of rubber layers, and the fastening belts and/or securing members are preferably embedded between the rubber layers.

The tread pattern of the present invention preferably includes a first zone having:

a pair of side edge rows along axially opposed tread edges formed with a plurality of regularly spaced notches opening outwardly of the tread edges;

a pair of driving rows inside the side edge rows formed with a pattern suitable for driving on normal roads; and an anti-skid row at the axial center of the tread formed with a plurality of axial grooves disposed at regular intervals along the longitudinal axis of the tread for gripping the road surface.

The tread pattern preferably further includes a second zone disposed alternately with the first zone, said second zone including at least one axial groove extending between axially opposed tread edges.

The flexible surface is preferably formed with a plurality of protrusions along its axially opposed edges for abutting against shoulders of the vehicle tire.

The flexible surface is preferably formed with a means for increasing traction with the tire tread.

The securing member preferably has at least one elongated opening extending over axially opposite edges of the rubber laminate and preferably the lips and the elongated opening of the securing member are tapered at their ends.

The securing members are not fixedly secured to the fastening belts.

The coupling means preferably include a male member pivotably secured to one end of the fastening belt and a female member pivotably secured to the other end of the fastening belt.

The male member includes an axially extending first shaft of rotation provided with a worm gear, and a second shaft of rotation perpendicular to the first shaft which is threaded about its circumference and provided with a gear engaging the worm gear either directly or with an intervening train of gears.

The female member includes a threaded hole for receiving the second shaft.

The fastening belt is tightened upon screwing the second shaft into the threaded hole by rotating the first shaft in a predetermined direction for rotating the second shaft, to thereby allow the male member to approach the female member.

The fastening means preferably includes a fastener to be disposed on the outer side of a vehicle wheel and a linkage to be disposed on the inner side of the vehicle wheel.

The fastener preferably includes:

a ring member housing first and second pulleys therein via an axially extending shaft at positions along an inner circumference of the ring member corresponding to each of the lips;

sliding members having a third pulley on one end and a lip-engaging means on the other end, the third pulley being slidably mounted within the ring member for allowing translation radially of the ring member;

the first, second and third pulleys providing a tackle for each lip;

a cable threaded around each of the tackles to form a loop around the first, third and second pulleys, and to serially connect all of the tackles; and the fastener pulling each of the lips inwardly upon shortening the loops by tightening the cable with a take up unit mounted within the ring member.

The linkage preferably includes a plurality of pivotably interconnected links having a lip-engaging means formed at an end for positioning each of said lips in relation to adjacent lips.

BRIEF DESCRIPTION OF THE DRAWINGS

FIG. 7 is a plan view of a coupling means.

FIG. 8 is side view of the coupling means.

DETAILED DESCRIPTION OF THE INVENTION

Figure 1:
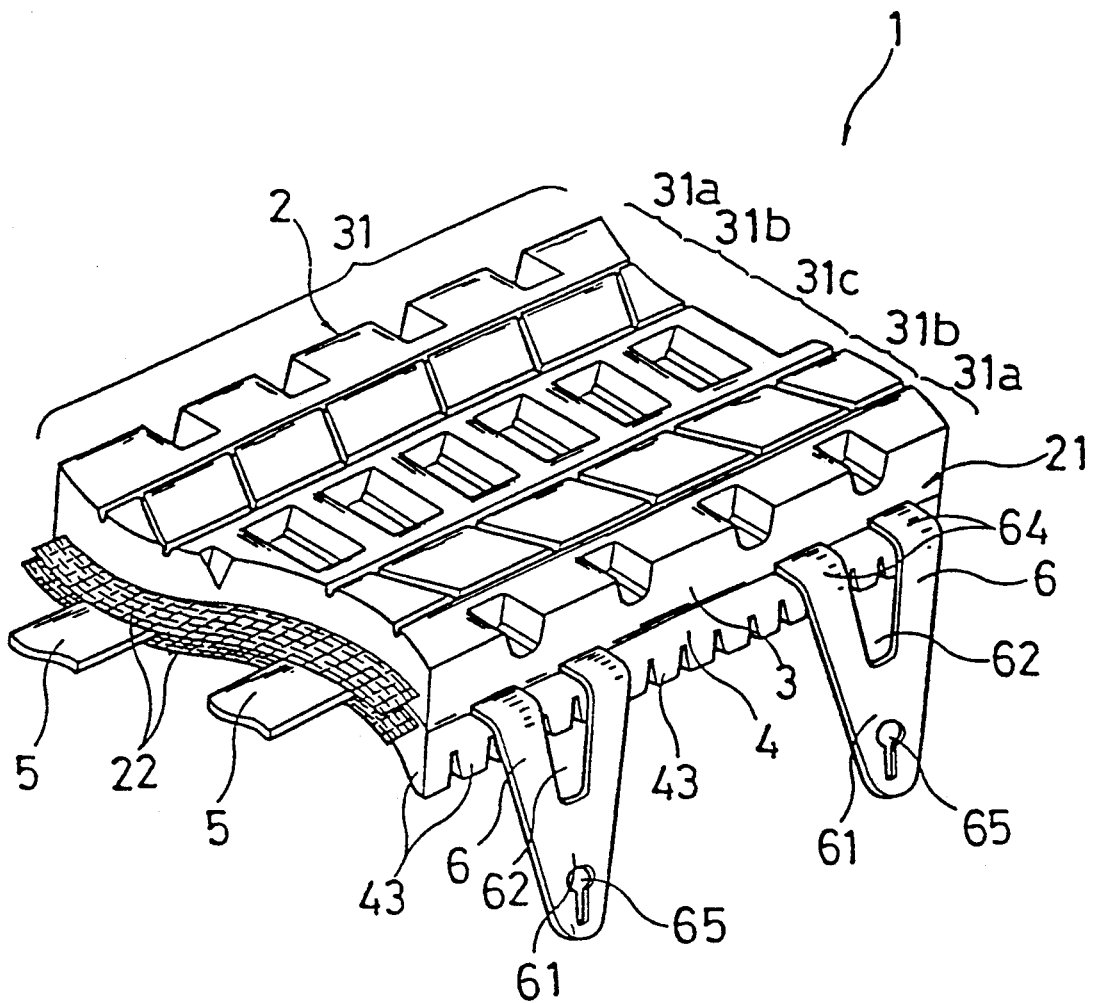
FIG. 1 is a partially cutaway perspective view of a preferred embodiment of an anti-skid device according to the present invention.

The present invention is described in detail referring to preferred embodiments illustrated in the drawings.

Unless otherwise indicated, the term "axial" and "axially" refer to a direction parallel to the rotational axis of a tire.

FIG. 1 is a partially cutaway perspective view of a preferred embodiment of the anti-skid device 1 comprising a rubber laminate 2 including a first rectangular rubber layer 3 defining the outer surface and a second rectangular rubber layer 4 defining the back surface.

A tread pattern or configuration is formed on the first rubber layer 3, that is, on the rubber laminate 2. A preferred tread configuration is illustrated in FIG. 2.

Figure 2:
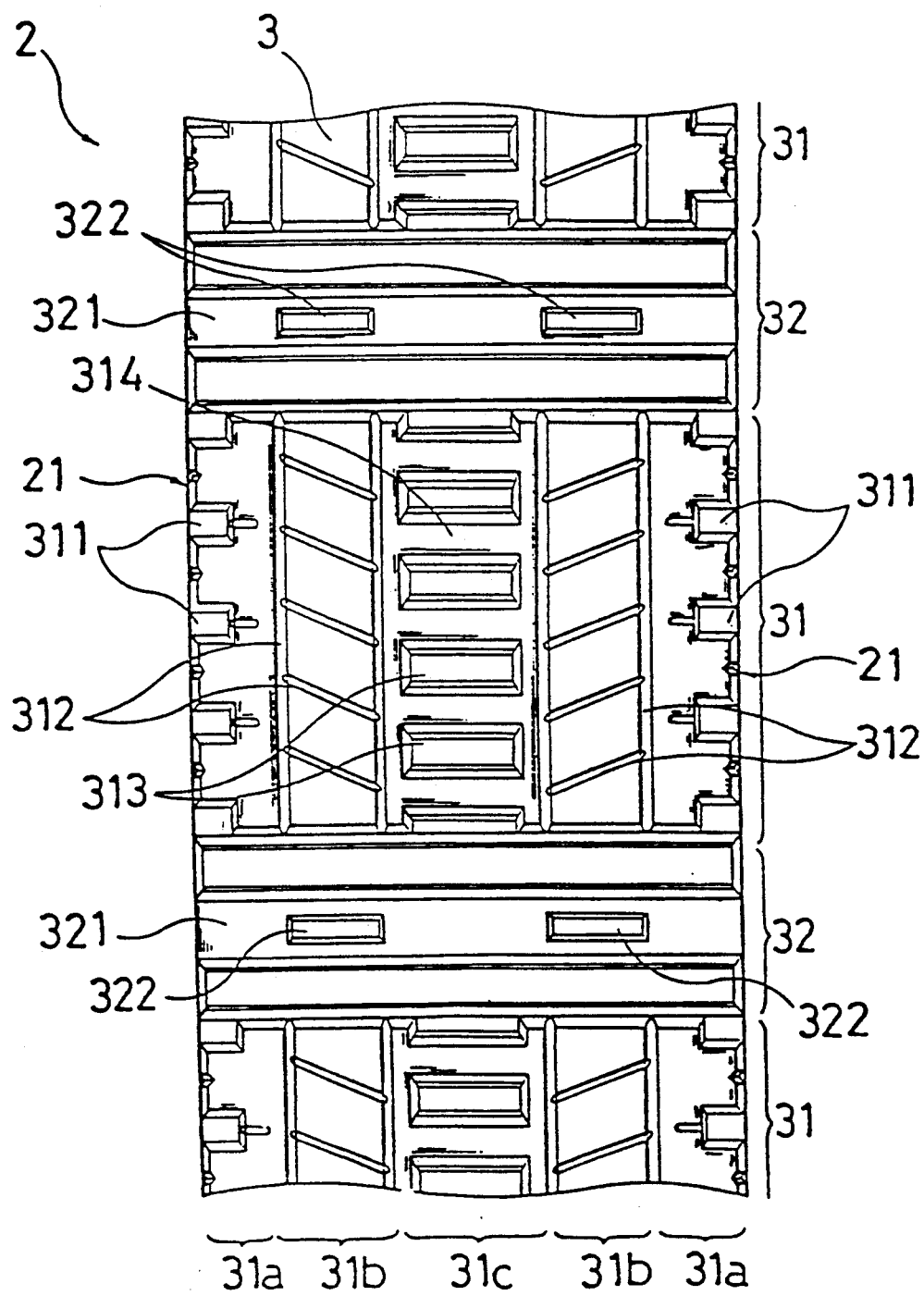
FIG. 2 is a partial plan view of a tread configuration of the anti-skid armor according to the preferred embodiment of FIG. 1.

As shown in FIG. 2, the tread pattern on the first rubber layer 3 includes a first zone 31 and a second zone 32 alternately disposed along the longitudinal or circumferential surface of the rubber laminate 2.

The first zone 31 includes a pair of side edge rows 31a along axially opposed tread edges, a pair of driving rows 31b inside the side edge rows 31a, and an anti-skid row 31c at the axial center of the tread.

The side edge rows 31a are formed with a plurality of notches 311 opening outwardly of the axially opposed side edges 21 of the rubber laminate 2. The notches 311 are disposed at regular intervals along the circumference of the rubber laminate and chiefly function to prevent axial skidding of the tire.

The driving rows 31b perform a driving function on normal roads and are typically patterned for normal driving conditions. In an exemplary embodiment illustrated in FIG. 2, the driving rows 31b are provided with a combination of grooves 312 comprising a pair of circumferentially extending parallel grooves and uniformly spaced apart diagonal grooves running between the circumferentially extending grooves. Such a configuration ensures a stable drive on both dry and wet roads.

The anti-skid row 31c is formed with a plurality of uniformly circumferentially spaced apart lateral grooves 313. The grooves 313 are relief elements into which snow, dirt and sand are taken in so that the road-engaging surface of the tire belt 1 contacts the road directly. This configuration improves gripping properties of the tire belt 1 to provide a better traction upon acceleration and prevents skidding upon deceleration, breaking and cornering, enabling a safe drive.

In the anti-skid row 31c, the lateral grooves 313 are defined within a ladder-like rib 314 which is independent of the adjacent driving rows 31b. The ladder-like rib 314 sufficiently strengthens the anti-skid row 31c to prevent the tire belt 1 from being ruptured at the anti-skid row 31c even after driving a long distance on normal roads.

Bottom edges of the notch 311 and the lateral groove 313 may be provided with a taper to aid an instantaneous evacuation of snow and the like taken therein.

The second zone 32 is formed with a lateral groove 321 extending between and opening outwardly of the axially opposed side edges 21 of the rubber laminate 2. Even if the first zone 31 should allow circumferential slipping of the tire, the second zone 32 may stop the slipping.

For example, upon acceleration on snow, traction is likely to be reduced to cause circumferential slipping of the tire at the first zone 31. The groove 321 in the second zone 32 axially extending throughout its width may then pool snow on the road-engaging surface of the tire to regain the snow traction and stop the slipping.

The groove 321 functions as an edge to exert traction and braking force particularly on deep snow or packed ice when the tread of the tire belt does not contact the pavement.

As shown in FIG. 2, a pair of lateral ridges 322 may preferably be provided in the groove 321 at positions axially corresponding to the driving rows 31b. The provision of the lateral ridges 322 facilitates a more stable drive at a lower noise level on normal pavement since the ridges 322 fill gaps defined between the driving rows 31b of the adjacent first zones 31.

Apart from the embodiment illustrated in FIG. 2, two or more grooves 321 may be provided in one second zone 32. Configuration of the groove 321 as well as the ridge 322 are not limited to the one illustrated in FIG. 2.

Although the alternating first and second zones 31 and 32 are disposed alternately around the circumference of the laminate 2 in the embodiment of FIG. 2, it will be appreciated that the tread may solely comprise the first zone 31 throughout its length without provision of the second zone 32. It is clearly understood that the tread configuration is not limited to those described above.

The second rubber layer 4 on the back of the rubber laminate 2 has a flexible surface 41 to facilitate a close contact of the belted tire 1 with the tread 171 of the tire 17. The flexible surface 41 may preferably be either provided with, for example, a longitudinal groove 42 and/or projections (not shown) or surface-roughened to increase friction between the flexible surface 41 and the tire tread 171. The thus provided closer contact between the flexible surface 41 and the tire tread 171 avoids displacement of the anti-skid device 1 on the vehicle tire 17 since the flexible surface 41 is likely to follow the contour of the vehicle tire 17 even if the tire is deformed during operation.

Figure 3:
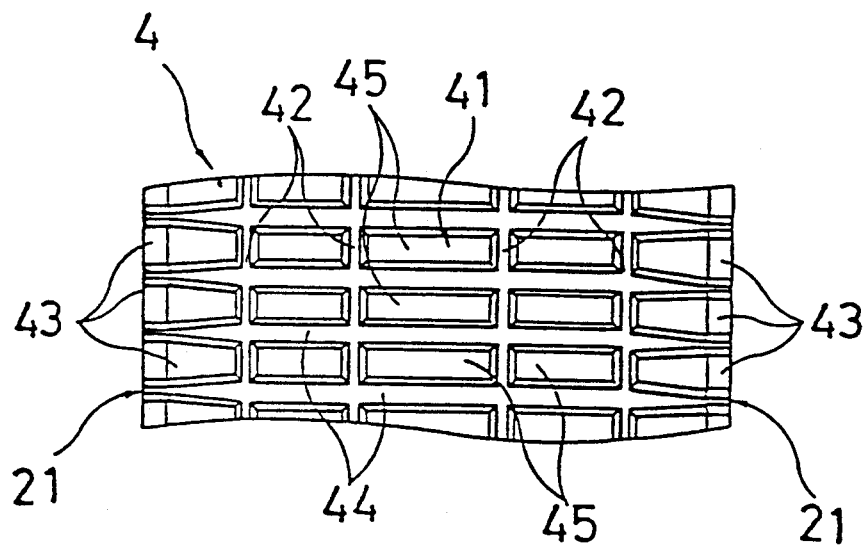
FIG. 3 is a partial plan view of a flexible rear surface of anti-skid armor according to a preferred embodiment of the present invention.

For example, referring to FIG. 3, there is illustrated a preferred configuration of the flexible surface 41 wherein a plurality of lateral grooves 44 axially extend between and through the opposed edges 21 of the rubber laminate 2. The lateral groove 44 temporarily accommodates foreign matters such as muddy water and sand, and aids their evacuation from opposite ends 21. in case they should enter between the flexible surface 41 and the tire tread 171. Since no foreign matter is present between tire-engaging portions 45 in the flexible surface 41 defined by grooves 42 and 44 and the tire tread 171, a close contact is retained therebetween to avoid displacement of the anti-skid device.

The longitudinal and lateral grooves 42 and 44 also function to dissipate heat generated by the friction between the flexible surface 41 and the tire tread 171. The flexible surface 41 may be formed with a plurality of protrusions 43 along its axially opposed edges for abutting against shoulders 172 of the vehicle tire 17. When the tire belt 1 is mounted on the tire 17, the protrusions 43 become engaged with the shoulders 172 of the tire 17 preventing an axial displacement of the anti-skid device 1 during usage.

Although the rubber laminate 2 is set forth as being comprised of the first rubber layer 1 and the second rubber layer 4, it will be appreciated that the rubber laminate may comprise either a single layer or three or more layers.

The rubber layers constituting the rubber laminate 2, which are the first and second rubber laminates 3 and 4 in the embodiment illustrated in FIG. 1, may be prepared from any rubber material. Non-limiting examples of the rubber material include natural rubber (NR), diene rubber such as isoprene rubber (IR), styrene-butadiene rubber (SBR), butadiene rubber (BR), chloroprene rubber (CR), acrylonitrile-butadiene rubber (NBR, NIR, NBIR), non-diene rubber such as butyl rubber (IIR), urethane rubber (U), and a mixture thereof.

The rubber material may further include an additive such as a curing agent, curing accelerator or its aid, curing retarder, scorch retarder, aging retarder, antioxidant, filler such as carbon black, reinforcing agent, softener, plasticizer, tackifier, hardener, dispersant, and processing aid.

The rubber material constituting the rubber laminate 3 is appropriately selected to meet the end use and required functions. For example, a material having a good wear resistance, cold-temperature resistance and elasticity is selected for the first rubber layer 3, and a material capable of facilitating a close contact with the tread 171 of the vehicle tire 17 is selected for the second rubber layer 4.

The first and second rubber layers 3 and 4 may preferably comprise rubber materials which exhibit analogous properties and whose functions are unlikely to be degraded to exhibit hardening or deterioration at low or high temperatures.

The rubber laminate should also have strength and durability for various stresses applied on the anti-skid device during its operation. The rubber materials must be selected by taking all these factors into account.

Total thickness of the rubber laminate 2 may vary from about 1.5 to about 3.0 cm when the rubber laminate comprises a typical tire material such as styrene-butadiene rubber (SBR). A thickness less than 1.5 cm results in a reduced stability upon curing/molding the laminate 2 with the members 5, 6 and 22 embedded therebetween, and in an insufficient depth of the grooves and notches defined in the tread of the anti-skid device 1, detracting from anti-skid properties. A thickness exceeding 3 cm results in a substantially increased diameter of the vehicle tire 17, and consequently in a larger error in the speedometer and odometer, although the total strength of the rubber laminate 2 may increase.

Figure 4:
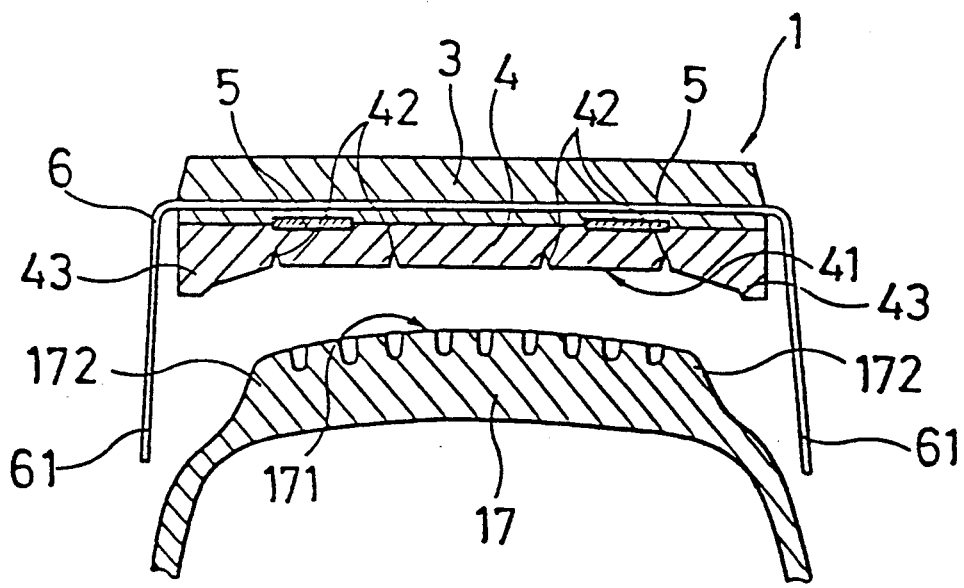
FIG. 4 is a transverse cross-section of the anti-skid armor according to the present invention.

As shown in FIGS. 1 and 4, fastening belts 5 and securing members 6 are embedded in the rubber laminate 2.

At least two fastening belts 5 are circumferentially embedded in the rubber layer 2 substantially parallel to each other. The fastening belts 5 are employed to fixedly secure the anti-skid device 1 over the entire circumference of the tread 171 of the vehicle tire 17. Two or more fastening belts 5 are thus required. If there is only one fastening belt, the anti-skid device 1 is likely to be displaced during a deformation of the tread 171 of the rotating tire 17 when the fastening belt is instantaneously loosened. Two or more fastening belts may avoid such displacement of the tire belt 1 since at least one fastening belt remains tightened until the other belt is retightened after being loosened by the deformation of the tire tread 171.

The fastening belt 5 may be prepared from any material capable of enduring the tension applied thereto. Non-limiting examples of the material include a strip of metal such as steel and stainless steel, a ceramics strip, and resin treated or impregnated bundle of knitted or unknitted synthetic fibers such as ceramics, nylon, Teflon and Kevlar.

A plurality of securing members 6 are embedded in the subber laminate 2. The securing members 6 extend substantially perpendicular to the fastening belts 5, and are disposed at regular intervals along said fastening belts 5. The securing members 6 axially tighten and stabilize the anti-skid device 1 over the entire circumference of the tread 171 of the tire 17.

Figure 5:
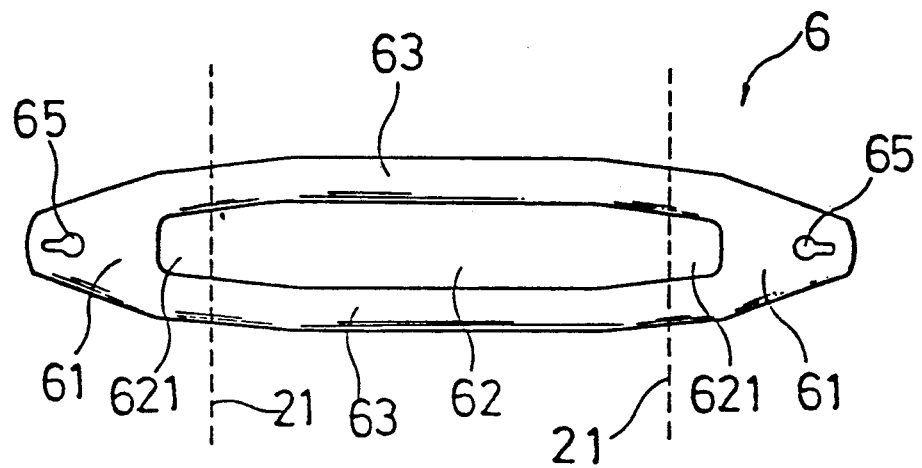
FIG. 5 is a plan view of a securing member in an unfolded state.
Figure 6:
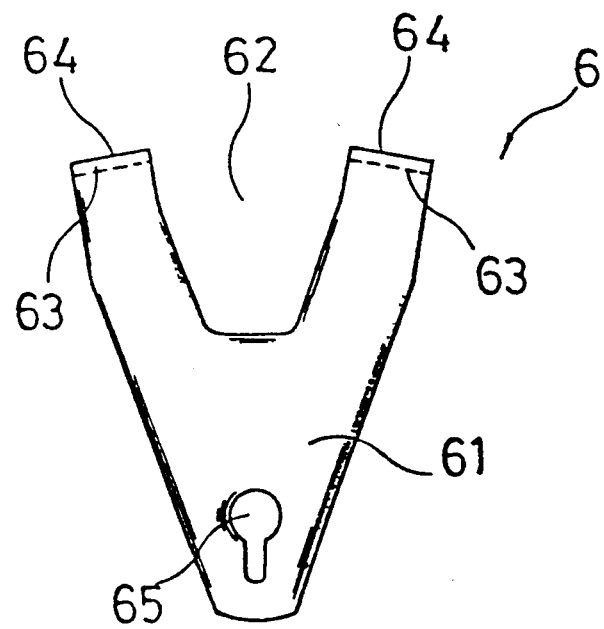
FIG. 6 is a side view of the securing member.

A preferred embodiment of the securing member 6 is illustrated in FIG. 5. It is to be noted that the securing member 6 is illustrated in its developed state with lips unfolded for ease of understanding.

The securing member 6 is a boat-shaped thin plate having an elongated opening 62 extending lengthwise and lips 61 on opposite ends as shown in FIG. 5. The elongated opening 62 provided in the securing member 6 increases integrity of the securing member 6 with the rubber laminate 2 to prevent the securing member 6 from peeling off in the laminate 2 by the stress applied during operation.

Two broken lines in FIG. 5 indicate the axial opposite ends 21 of the rubber laminate 2. The lips 61 protruding out of the edges 21 of the rubber laminate 2 are bent toward the vehicle tire 17 so that the lips 61 may be engaged on the opposed sides of the vehicle tire. Opposite end portions 621 of the elongated opening 62 are located beyond the opposite ends 21 of the rubber laminate 2.

The lip 61 is pulled toward the center of the vehicle tire 17 by a fastening member comprising a fastener 10 and a linkage 16 as set forth hereinafter. The lip 61 is formed with a mating means such as a key slot 65 for engaging with an appropriate member of the fastening member.

The lips 61 and the end portions 621 of the elongated opening 62 are tapered. Upon bending the lip 61, bent portions 64 and beams 63 defining the elongated opening 62 are deformed to closely fit along the arc or periphery of the tire 17. A closer contact between the flexible surface 41 and the tire tread 171 is thus facilitated upon pulling the lips 61 toward the center of the tire 17.

It is to be noted that the securing member 6 is not limited to the above-specified configuration, and other configurations with no opening 62 or with two or more openings may be used as well.

The securing member 6 may be formed from a metal such as steel or stainless steel or a plate of ceramics, among which a highly corrosion resistant material such as stainless steel or a corrosion-preventive plated steel being preferred.

Although the fastening belts 5 and the securing members 6 are both embedded in the rubber laminate 2, they are preferably not fixedly secured to each other. Since the fastening belts 5 and the securing members 6 are disposed perpendicular to each other and tightened in different directions, that is, circumferential and radially inward directions, different forces are applied on them during rotation of the tire resulting in their independent movements. If the securing members 6 are fixedly secured to the fastening belts 5, various tensions are likely to be concentrated at and near their junctions to cause a crack or rupture of the anti-skid device 1.

When the rubber laminate 2 comprises two or more rubber layers, the fastening belts 5 and/or the securing members 6 may preferably be interposed between the rubber layers for ease of manufacture. The tire belt 1 of the present invention is prepared by subjecting the first rubber layer 3 to pressure on a mold of a pressing machine and compression molding in the mold to provide the tread with a pattern, and then overlaying other rubber layers in a predetermined order and subjecting these layers to a pressure by the pressing machine to vulcanize and shape these layers into the rubber laminate 2. The fastening belts 5 and the securing members 6 are sandwiched between the rubber layers during the above-described process.

Circumferential and axial tensile stresses are exerted on the rubber laminate 2 of the anti-skid device 1 during usage on vehicle tire 17. Large complicated stresses are received by the rubber layer 2 particularly upon braking, cornering, driving on rough roads, and high speed driving. There arises a danger of tearing or rupturing of the anti-skid device 1 which is exaggerated by deterioration of the rubber laminate 2. it is, therefore, preferred to embed a reinforcing member 21 for increasing the overall strength of the rubber laminate 2.

The reinforcing member 21 may preferably comprise a mesh due to its relatively light weight, high strength, large surface area, and excellent adhesion to the rubber layer. Illustrative meshes utilized for the reinforcing member 21 include woven or unwoven fabrics and nets of fibrous metal and resin such as nylon, Kevlar, ceramics, punched metal, resin screen and the like. A reinforcing member 21 having a large mesh as illustrated in FIG. 1 is preferable since the rubber can get into the mesh allowing an increased integrity of the reinforcing member with the rubber layers sandwiching the reinforcing member therebetween. The large meshed reinforcing member 21 may also facilitate mutual fusing of the rubber layers during the vulcanization/shaping of the rubber laminate 2 to increase the integrity of the rubber layers. The type and configuration of the reinforcing member 21 are not limited to those above mentioned so long as effective for reinforcing the rubber laminate 2. For convenience of production, the reinforcing member may preferably be interposed between the rubber layers, as set forth above for fastening belts 5 and securing members 6.

Upon fitting the anti-skid device 1 around the vehicle tire 17, opposite ends of the fastening belts are coupled by a set of coupling means 7. FIGS. 7 and 8 show an embodiment of the coupling means comprising a male member 8 pivotably secured to one end 51 of the fastening belt 5 with a pin 83, and a female member 9 pivotably secured to the other end 52 of the fastening belt 5 with a pin 92. The opposite end portions 51 and 52 of the fastening belt 5 are folded back on themselves around pins 83 and 92 respectively, and bonded by means of spot welding or the like. Optional reinforcing members (not shown) may be provided around the pins 83 and 92 for preventing the belt 5 from being ruptured by wear.

The male member 8 includes an axially extending first shaft of rotation 81 provided with a worm gear 811 at about the center of the first shaft 81. A recess 812 is formed at one end of the first shaft 81 for receiving an appropriate tool 84 for turning the first shaft 81. The tool may resemble a screwdriver in shape, having a handle grip and a shaft of several ten centimeters. The recess 812 may have a straight, cross, square or hexagonal configuration.

The male member 8 is further provided with a second shaft of rotation 82 extending perpendicular to the first shaft or along the longitudinal axis of the fastening belt 5. The second shaft 82 is provided at one end with a gear 821 engaging the worm gear 811. The gear 821 may engage the worm gear 811 either directly or with an intervening train of change gears (not shown). The second shaft 82 includes a threaded portion 822 protruding out of the male member 8.

On the other hand, the female member 9 is formed with a threaded hole 91 for receiving the threaded portion 822 of the second shaft 82. The threads formed inside the threaded hole 91 correspond to the treads 822 formed on the second shaft 82.

Turning now to a description of a coupling and tightening operation utilizing the coupling means 7, the tool 84 is inserted into the recess 812 and turned in a predetermined direction to rotate the first shaft 81 and consequently the second shaft 82. In the meantime, the threaded end of the second shaft 82 is mated with the threaded hole 91. The second shaft 82 screws into the threaded hole 91 allowing the male and female members 8 and 9 to approach to thereby tighten the fastening belt 5. Degree of fastening is controlled by changing the distance between the male and female members 8 and 9.

When the tool 84 is removed from the recess 812, a mechanism including the worm gear 811 avoids any loosening of the fastening belt 5 maintaining the relative position of the male and female members 8 and 9 as it was.

Such a coupling means 7 may preferably be provided independently for each fastening belt 5 as illustrated in FIGS. 7 and 8 so that each fastening belt 5 is provided with the male and female members 8 and 9 at its opposite ends. The degree of fastening in each fastening belt can then be independently adjusted, and even if one fastening belt is loosened, other belts are not effected by that.

A plurality of fastening belts 5 may also be fastened at once by one coupling means comprising a pair of male and female members 8 and 9 for purposes of simplifying the arrangement.

A protective cover (not shown) may optionally be provided on the coupling means 7 for preventing foreign matters such as dirt, sand, gravel and dust from getting into the engagement between the worm gear 811 and gear 821, or threaded portion 822 of the second shaft of rotation 82.

The coupling means 7 is not limited to that above-described so long as it couples opposite ends of the fastening belt 5 in a tightened state upon fitting the anti-skid device 1 around the vehicle tire 17 to facilitate a close contact between the flexible surface 41 and the tread 171 of the tire 17.

The anti-skid device 1 is securely mounted around the vehicle tire 17 with a fastening means which pulls the lips 61 inwardly toward the rotational axis of the tire.

Figure 9:
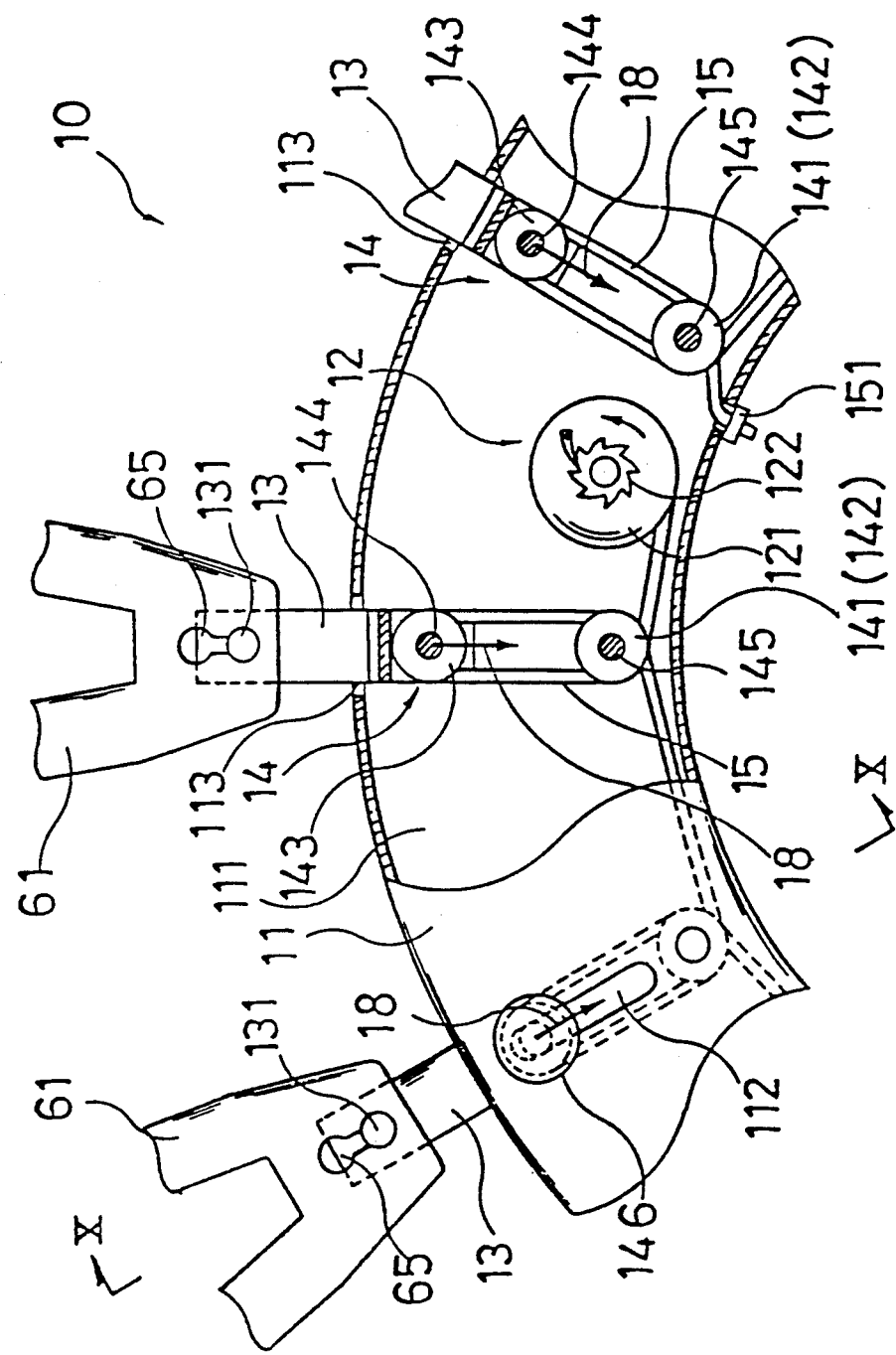
FIG. 9 is a partially cutaway view of a fastener.
Figure 10:
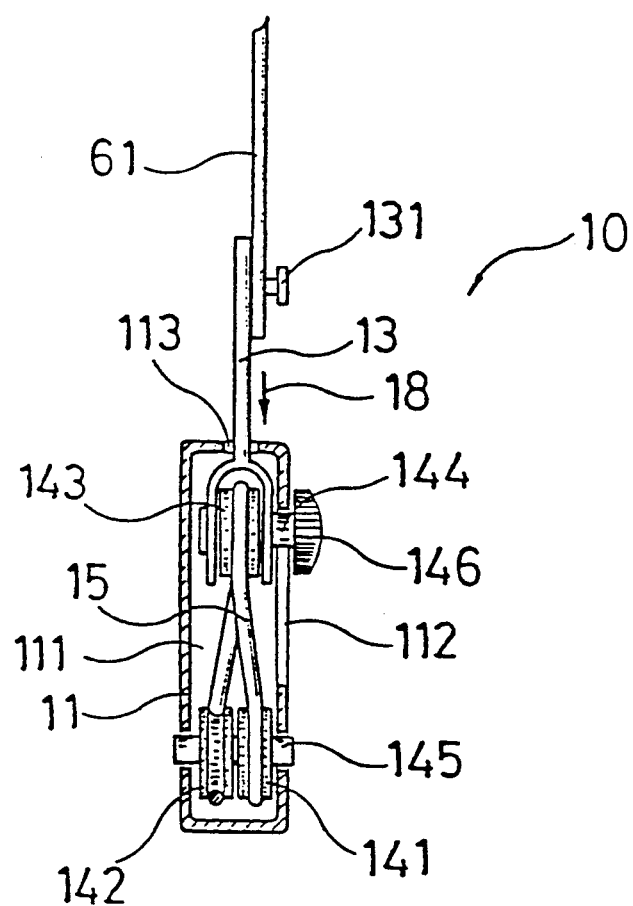
FIG. 10 is a partial cross-section taken along lines X—X of FIG. 9.
Figure 11:
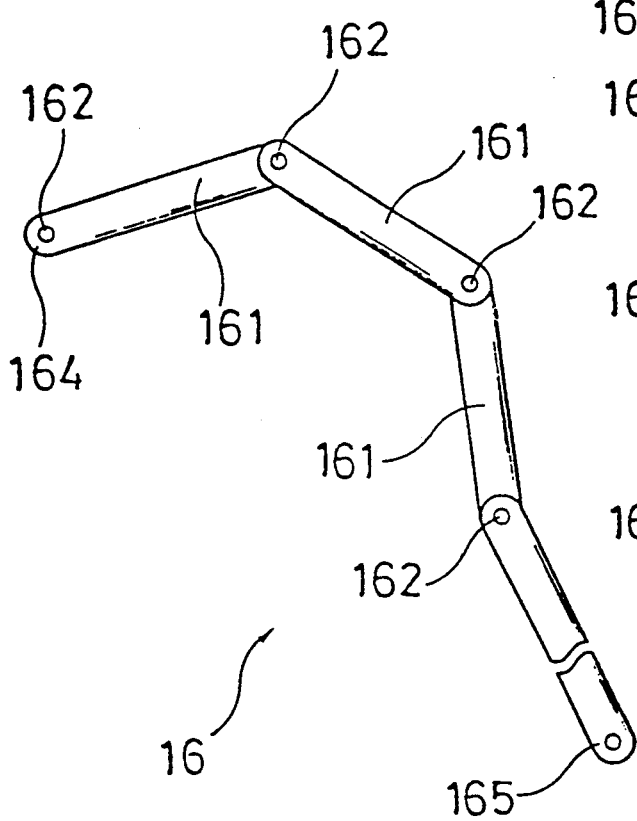
FIG. 11 is a plan view of a linkage.
Figure 13:
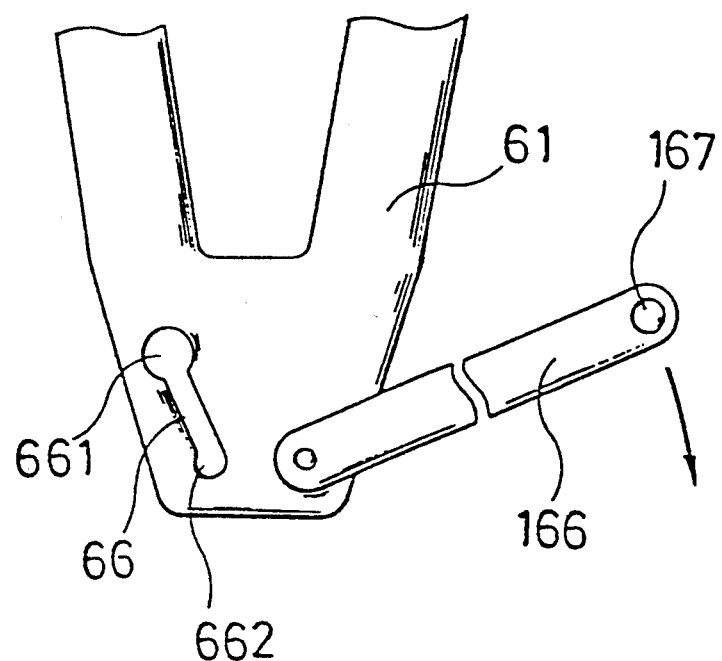
FIG. 13 is a partial side view of an example of a lip-connecting means on the inner side of a wheel.

The fastening means comprises a fastener 10 to be disposed on the outer side of a vehicle wheel which is partially illustrated in FIGS. 9 and 10 and a linkage 16 to be disposed on the inner side of the vehicle wheel as shown in FIGS. 11 and 13.

Referring to FIGS. 9 and 10, there are illustrated the fastener 10 which has a ring member 11 defining an interior space 111 for housing tackles 14, a take up unit 14, and the like therein.

The ring member 11 houses in its interior space 111 coaxial first and second pulleys 141 and 142 via an axially extending shaft 145 at positions corresponding to each of the lips 61 along an inner circumference of the ring member 11.

The ring member 11 is formed with radially extending elongated slots 112 on its outer side at positions corresponding to each of the lips 61. A shaft 144 supporting a third pulley 143 thereon extends through the elongated slot 112 serving as a guide member for a radially sliding member 13.

The sliding members 13 are slidably mounted within said ring member 11 at positions corresponding to each of the lips 61, and extend through slots 113 formed on the radially outward circumference of the ring member ii. The sliding member 13 is provided with the third pulley 143 via the shaft 114. A catch or protrusion 131 is formed on the other end of the sliding member 13 for mating through the slot 65 formed on the tip portion of the lip 61.

A handle 146 mounted on one end of the shaft 144 is located on the axially outer surface of the ring member. The handle 146 is used for engaging the catch 131 through the slot 65. Since the sliding member 13 is pulled inwardly into the rig member 11, the sliding member 13 must be pulled out by means of the handle 146 before the sliding member 13 can be engaged with the lip 61.

In this arrangement, the first, the second and third pulleys 141, 142 and 143 constitute a tackle 14 which is associated with each of the lips 61. A cable 15 is threaded around the tackle 14 to form a loop around the first, third and second pulleys 141, 143 and 142. The cable 15 serially connects all of the tackles 14.

In the tackle 14, the cable 15 may also be threaded around the pulleys in an order different from the above-specified order. Although three pulleys are shown in FIG. 10, the number of the pulleys is not limited thereto. Tackles of different arrangement may also be employed in one fastener.

As demonstrated in FIG. 9, one end of the cable 15 serially threaded around the tackles 14 is fixedly secured to the ring member 11 by means of a stopper 151 or the like. The other end of the cable 15 is wound by a take up unit 12 mounted at an appropriate position within the interior space 111 of the ring member 11.

The take up unit 12 comprises a take up spool 121 mounted in the ring member 11 via a shaft which is capable of winding a sufficient length of the cable 15, and a ratchet/pawl assembly 122 for preventing reverse rotation of the take up spool 121.

Upon counterclockwise rotation (FIG. 9) of the take up spool 121, the cable 15 is wound by the take up spool 121 and the loop around the tackle 14 is tightened. The sliding member 13 is then translated inwardly toward the center of the vehicle tire 17 as indicated by arrow 18 pulling the lips 61 in the same direction.

Figure 12:
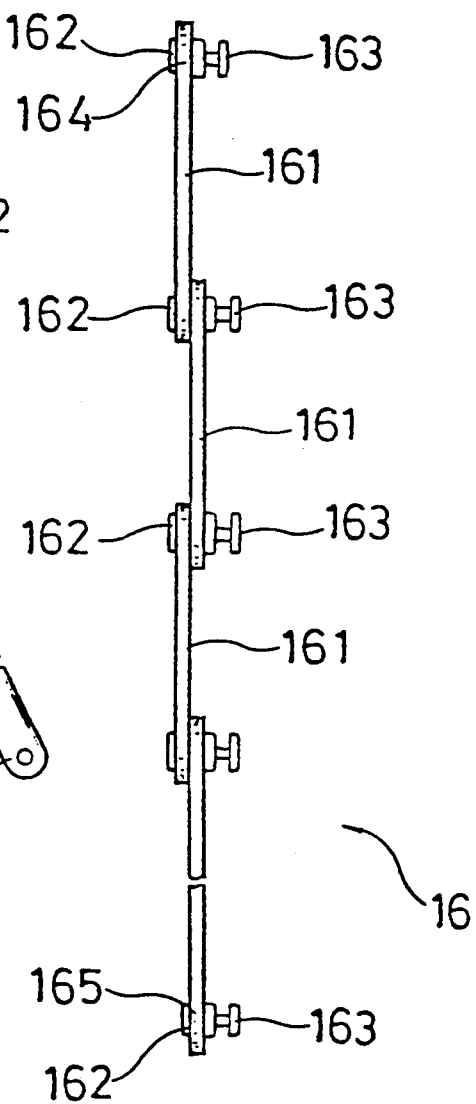
FIG. 12 is a side view of a linkage.

Referring to FIGS. 11 and 12, there are illustrated the linkage 16 to be disposed on the inner side of the vehicle wheel. The linkage 16 includes a plurality of links 161. The number of the links 161 corresponds to that of the lips 61. The links 161 are pivotably coupled at their ends in a serial arrangement by means of pins 162. The pins 162 are also provided at opposite ends 164 and 165 of the linkage 16.

As shown in FIG. 12, the pin 162 is provided at its head with a catch or protrusion 163 to mate through the slot 65 formed at the tip portion of the lip 61.

The linkage 16 is mounted on the inner side of the vehicle tire 17 by sequentially mating the catch 163 through the corresponding slot 65 of the lip 61 from the starting end 164 to the finishing end 165. Adjacent catches or protrusions 163 are spaced at a distance equal to or slightly shorter than the distance between the slots 65 of the adjacent lips 61 of the mounted anti-skid device 1 over the vehicle tire 1.7. With the thus arranged linkage 16, the lips 61 are positioned properly in relation to the adjacent lips 61 on the inner side of the vehicle tire 17.

FIG. 13 is a partial side view illustrating an alternative embodiment for the linkage 16. In this embodiment, an arm 166 is pivotably attached to the tip of the lip 61. A key slot 66 including a predetermined angle between the longitudinal axis of the lip 61 is formed beside one end of the arm 166 at the tip of the lip 61. A catch or protrusion 167 is provided at the other nd of the arm 166. The catch 167 is inserted into a head portion 661 of the key slot 66, and the arm is then turned in the direction indicated by an arrow. The catch 167 slides downward along the slot 66 until it reaches a bottom portion 662 of the key slot 66 to complete the fitting of the catch 167 through the key slot 66.

By carrying out this fitting process for each lip 61, all of the lips 61 are interconnected by the arms 166 and positioned properly on the inner side of the vehicle tire 17.

A detailed description of a embodiment of a tread pattern of a tire or anti-skid device according the present invention is set forth hereinafter referring to the drawings.

Figure 18:
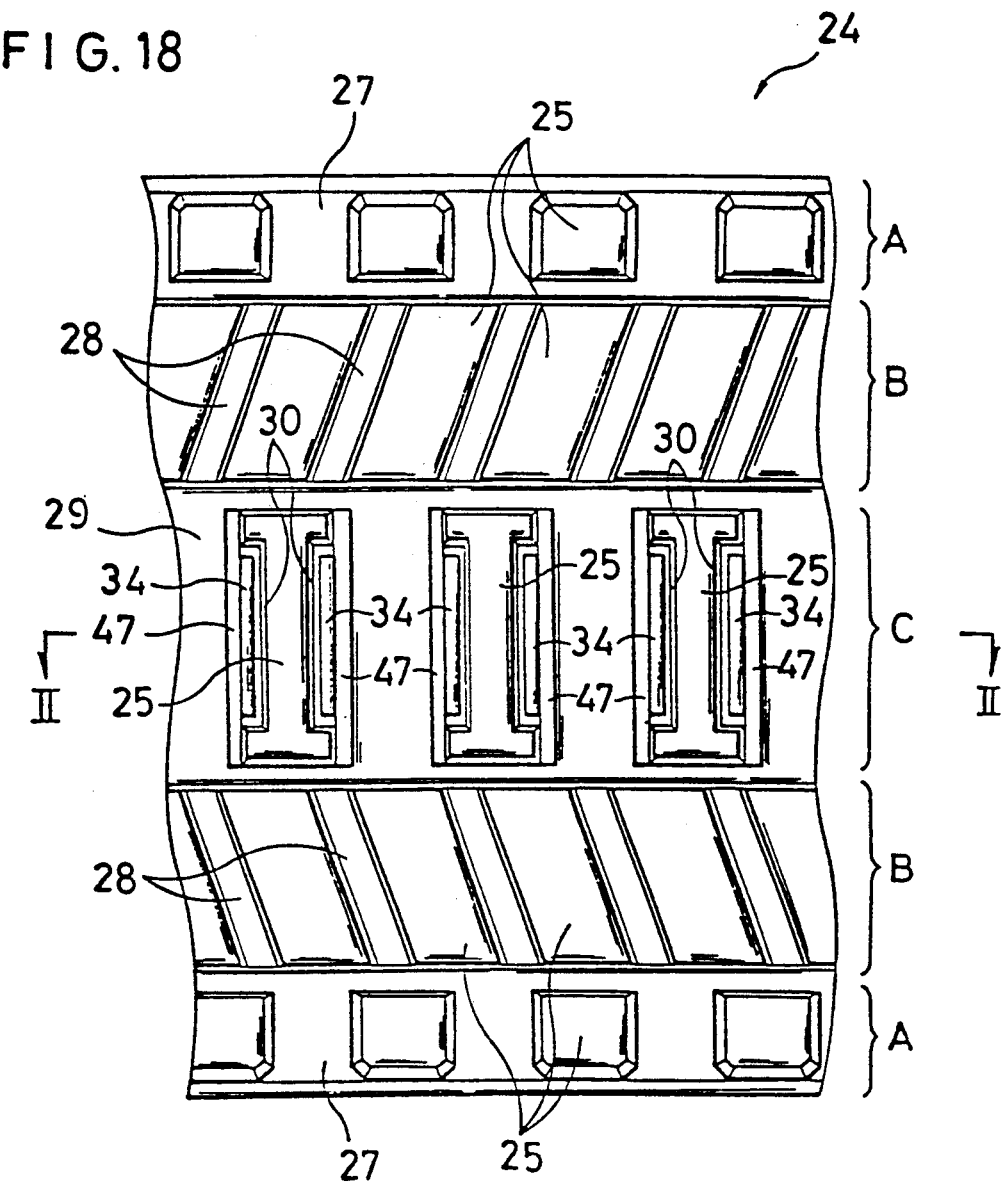
FIG. 18 is a plan view of a preferred embodiment of a tread pattern formed on a tire according to the present invention.

FIG. 18 is a plan view showing the preferred embodiment of a tread pattern.

Figure 19:
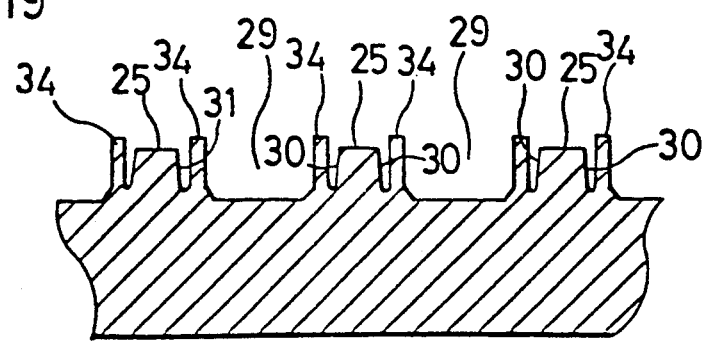
FIG. 19 is a cross-section taken along lines II—II of the tread pattern of FIG. 18.

FIG. 19 is a cross-section taken along lines II—II of FIG. 18.

As shown in FIGS. 18 and 19, the surface of the tire 24 comprises a pair of side edge rows A, A along axially opposed tread edges and a pair of driving rows B, B inside the side edge rows and an anti-skid row C at the axial center of the tread.

Each row has grooves recessed from the surface of the tread 25 which contacts the road directly.

The grooves are suitably formed corresponding to the function of the row as set forth hereinafter.

The side edge rows A, A are formed with a plurality of regularly spaced notches 27 opening outwardly of the tread edges. The notches 27 chiefly function to prevent axial. skidding of the tire 24.

The driving rows B, B perform a driving function on normal roads and are typically patterned for normal driving conditions. An exemplary embodiment is illustrated in FIG. 18.

The driving rows B, B are provided with declined grooves 28 uniformly spaced apart running circumferentially along the tire 24. Such a configuration ensures a stable drive on both dry and wet roads.

In the anti-skid row C, ladder-like recesses 29 are formed with comparatively large area. The recess 29 serve to take in snow, dirt and sand, and thus prevent these materials from intervening between the road surface and the tread 25. This configuration improves gripping properties of the tread to provide a better traction upon acceleration and prevents skidding upon deceleration, braking and cornering.

In the recess 29, protrusions 34, 34 are provided neighboring the inside walls 30, 30 of the tread 25 running circumferentially around the tire 24. The protrusion 34 is formed simultaneously with the recess of the tire 24 from the same rubber material. Their resilience allows the protrusions to bend freely.

As shown in FIG. 18, the protrusion 34 may preferably be plate-shaped extending along the inside walls of the recess 29.

Apart from the tread pattern shown in FIG. 18, a recessed area opening outwardly of the tread edges may be formed in the tread 25 with plate-shaped protrusions neighboring the inside walls of the recessed area.

Various patterns or shapes are available to form the protrusions other than the one shown in FIGS. 18 and 19. Typical patterns to form the protrusions 34 are hereinafter set forth according to FIGS. 20 to 24.

Figure 20:
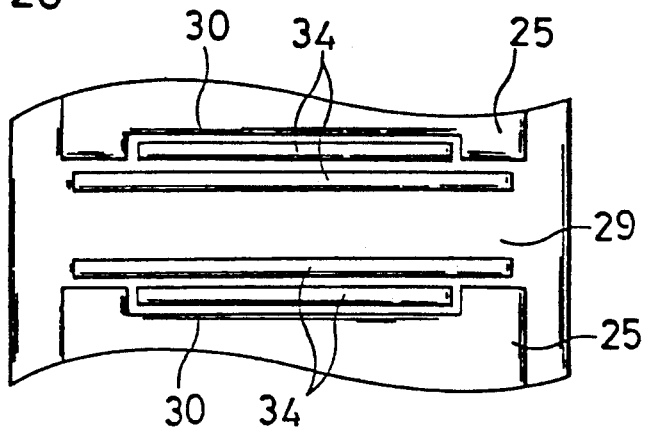
FIGS. 20, 21, 22, 23 and 24 are plan views of alternate tread patterns according to the present invention.

The example shown in FIG. 20 illustrates two plate-shaped protrusions 34, 34 with different heights both neighboring an inside wall 30.

Figure 21:
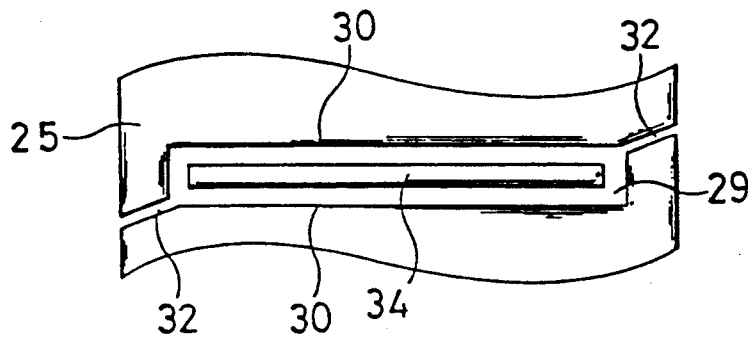

The example shown in FIG. 21 illustrates a protrusion 34 formed about the center of the recess 29. In this case drains 33, 33 are formed to aid instantaneous evacuation of water and the like in the recess 29.

Figure 22:
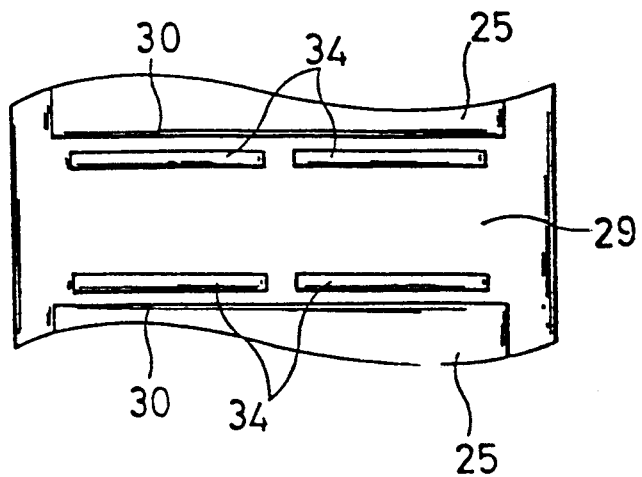

The example shown in FIG. 22 illustrates an embodiment with a plurality of aligned protrusions neighboring an inside wall 30.

Figure 23:
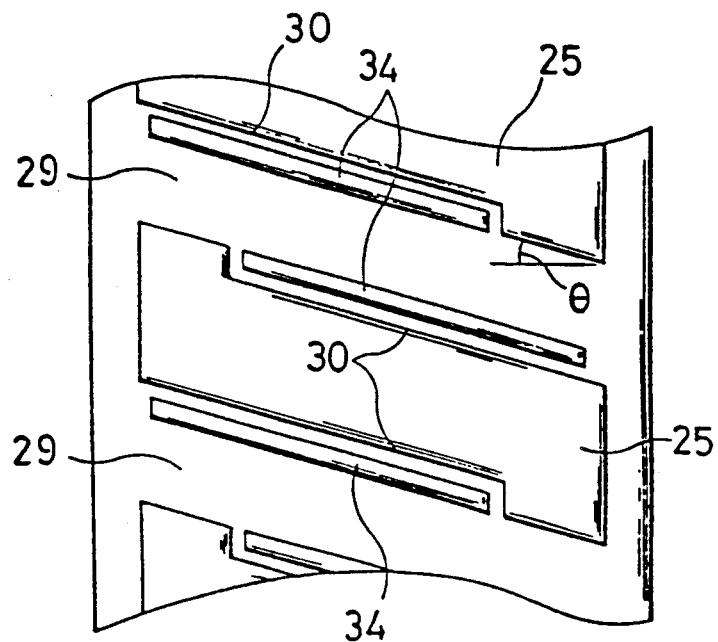

In the example shown in FIG. 23, the recess 29 extends at an angle to the axis and the protrusions 34, 34 are formed parallel to the inside wall 30, 30.

Figure 24:
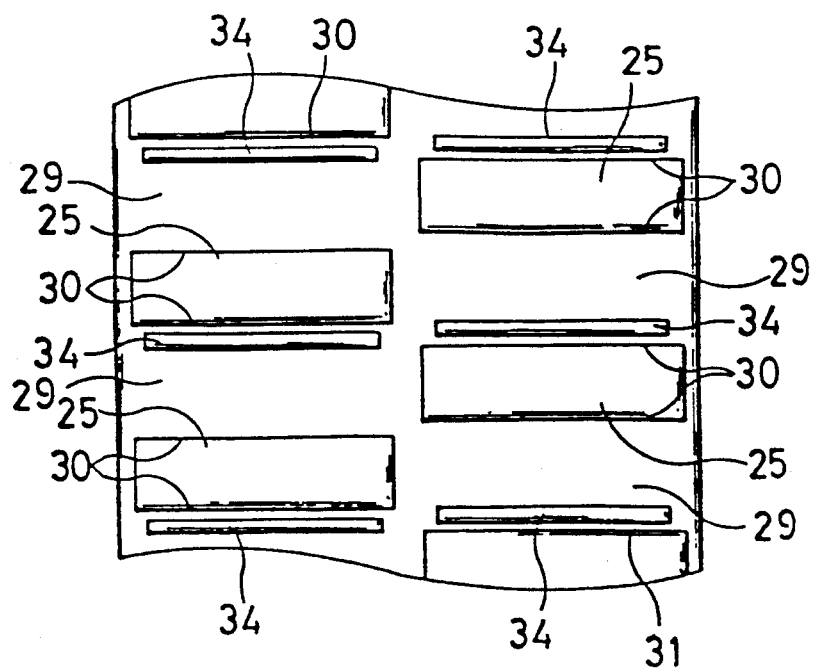

In the example shown in FIG. 24, a pair of circumferentially extending parallel recesses 29 are formed. In each of the left recesses 29, only one side of the inner wall 30 has neighboring plate-shaped protrusion 34. In each of the right recesses 29, the side opposite to the above-mentioned inner wall 30 has neighboring plate-shaped protrusion 34. The protrusion may be formed only at one side of the inner wall 30, 30.

Moreover, it is not necessary that all the recessed areas have a protrusion.

Figure 30:
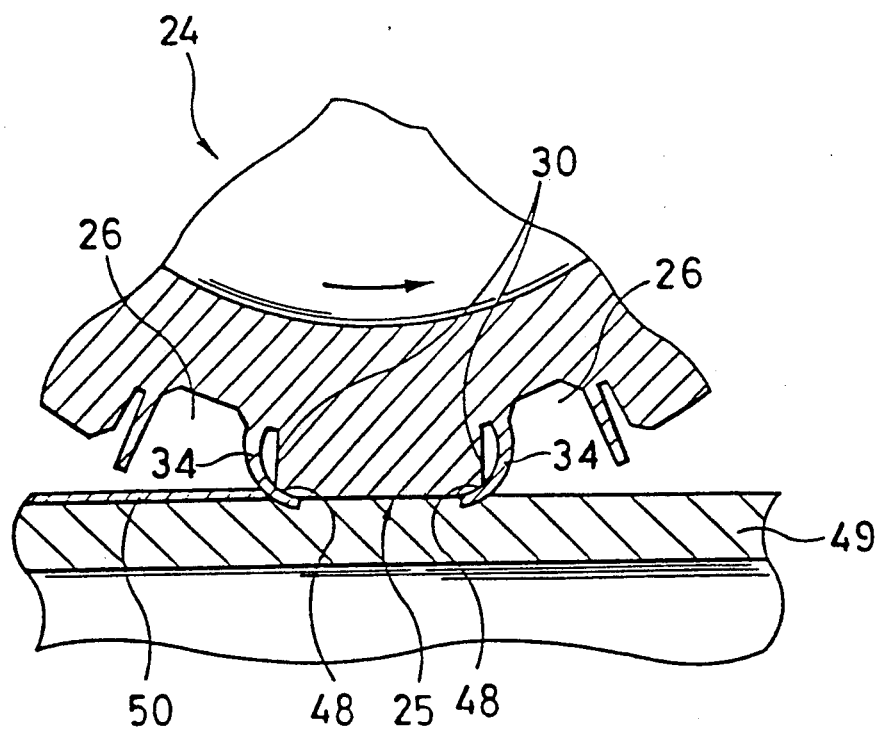
FIG. 30 is a partial transverse cross-section showing a tire with a tread pattern according to the present invention in contact with an icy road.

The tip of the protrusion 34, as shown in FIGS. 19 and 30, protrudes a predetermined length above the level of the road contact surface of the tread 25. Upon braking or starting, the tip of the respective protrusion bends toward the tread 25 and contacts the road prior to the tread 25, wedging into the space between the tread 25 and the road. This configuration, therefore, exerts resistance or friction between the tread and the road surface to provide greater braking or starting force.

Apart from the example shown in FIG. 19, the shape of the protrusion 34 may be formed as following.

Figure 25:
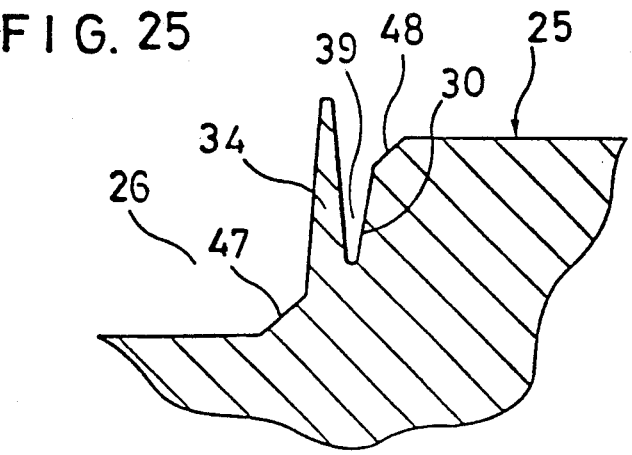
FIGS. 25, 26, 27, 28 and 29 are enlarged transverse cross-sections showing various embodiments of an anti-skid feature according to the present invention.
Figure 26:
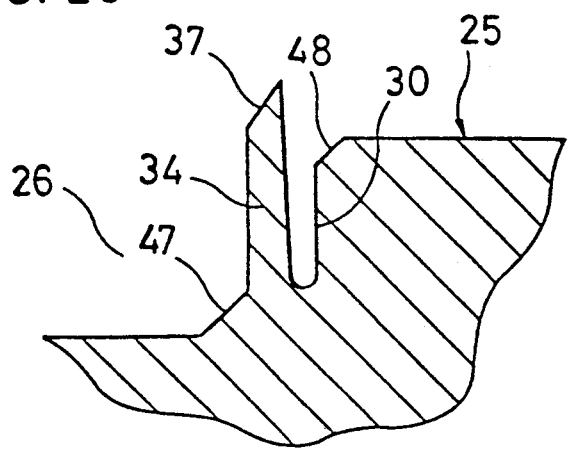

As shown in FIG. 25, the protrusion 34 is tapered to provide a swift bending of the tip of the protrusion 34. In this case, a notch 39 is formed between the protrusion 34 and the inner wall 30. As shown in FIG. 26, the tip of the protrusion 34 has an edge 37 declining inwardly to the recessed area 26 to aid the tip of the protrusion 34 in wedging into the gap between the road and the tread 25. Instead of the tapered part, a step may be formed at the tip of protrusion 34 to provide the same effect.

Figure 27:
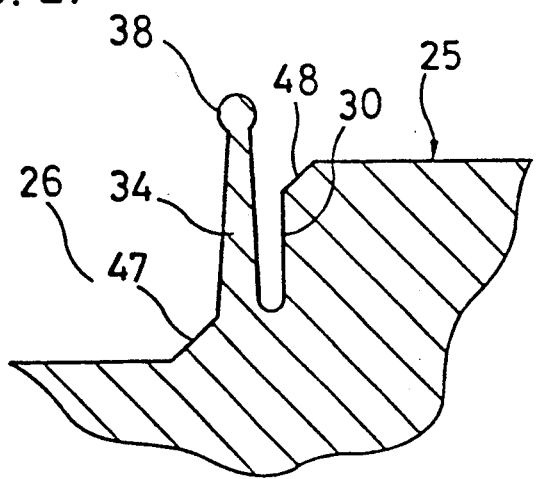

As shown in FIG. 27, a rounded head 38 may be formed at the tip of the protrusion 34. The rod-shaped head 38 produces an anti-skid effect upon braking by sticking into the road surface (ice layer 49) as the tip of the protrusion 34 wedges into the gap between the road and the tread 25.

Figure 28:
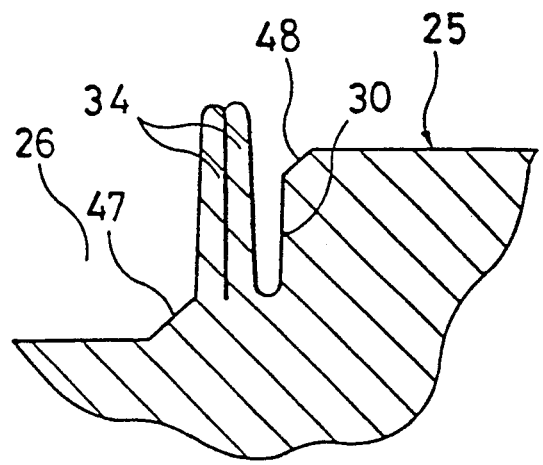

As shown in FIG. 28, two or more protrusions 34 may be formed adjoining each other. By this configuration, rupture by shock of an emergency braking is avoided. Additionally, gravel, trash, and the like can be evacuated instantaneously and an anti-skid effect is heightened on a road covered with wet snow.

Figure 29:
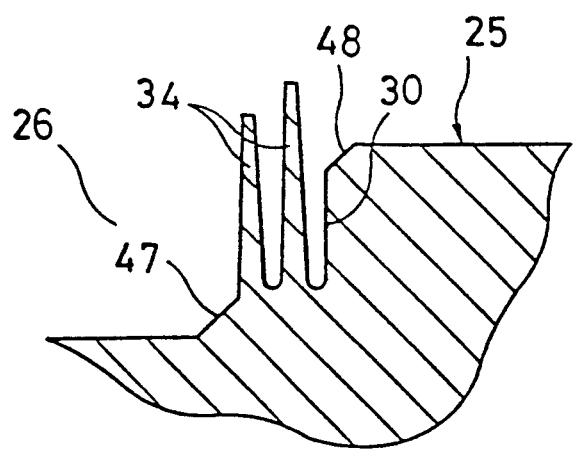

As shown in FIG. 29, two or more protrusions 34 with different heights may be formed apart from each other neighboring the inner wall 30. A heavy vehicle causes greater distortion of the tire and the protrusion formed on the tread of the tire intrudes deeper into the tread. The configuration shown in FIG. 29 prevents detracting from anti-skid property otherwise being caused by the collapse of the protrusions of the same height one upon another.

As shown in FIGS. 25 to 29, bottom edges of the recessed area 26 may be provided with a taper 47 to aid an instantaneous evacuation of snow and the like taken therein. Moreover, the shoulder of the inner wall 30 has a taper 48 to aid the tip of the protrusion 34 in wedging into the gap between the road and the tread 25 when the protrusion is bent toward the inner wall 30 upon braking or starting.

A rounded surface may be substituted for the taper 47, 48.

According to one aspect of the invention, the patterns of the protrusions shown in FIGS. 20 to 24 may be varied in shape or other properties.

It is noted that the shape and configuration of the recessed area and the shape and configuration of the protrusion 34 are not limited to those above mentioned.

The tread pattern according to the present invention may be applied to automobiles such as passenger cars, trucks and race cars such as rally cars, special cars such as automobiles for construction use and to an anti-skid device (for example, an anti-skid device disclosed in Japanese Patent No. 62-16918) secured on the tires of the vehicles.

A tire and an anti-skid device according to one aspect of the present invention is hereinafter described referring to FIG. 31.

Figure 31:
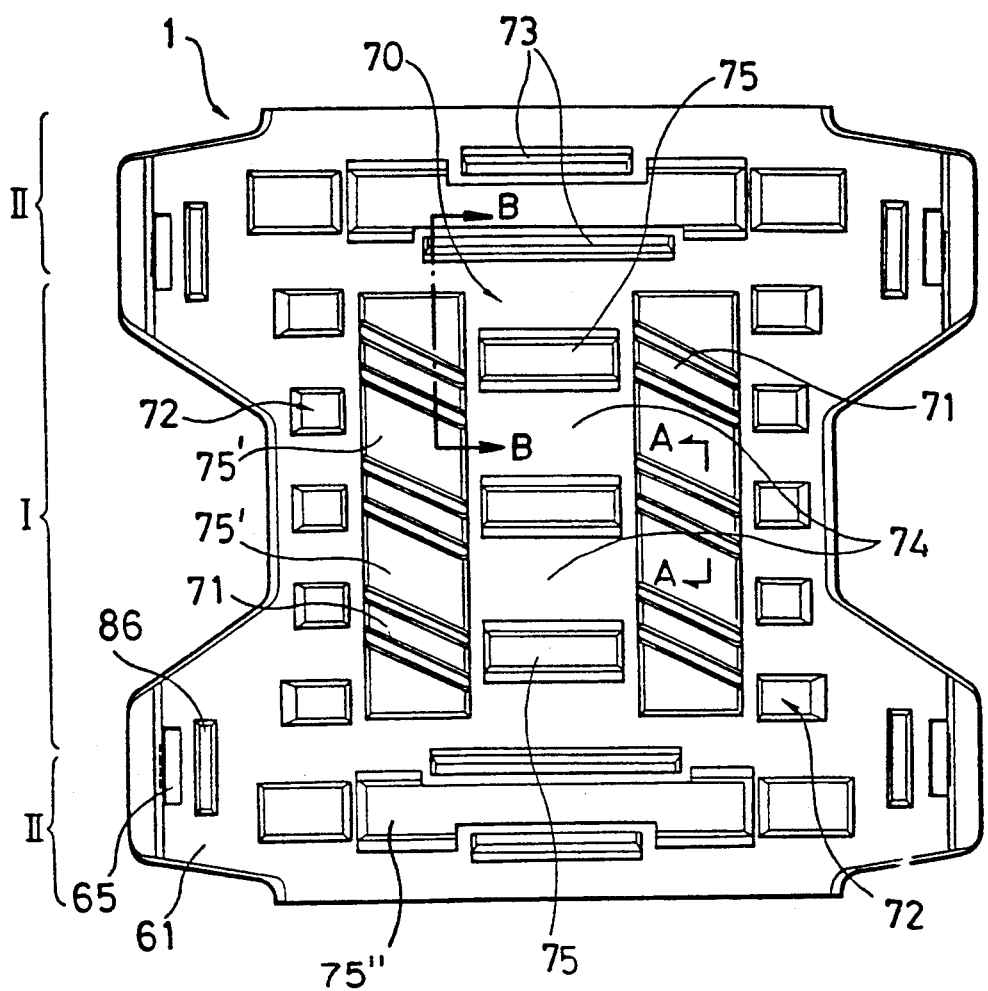
FIG. 31 is a partial plan view of a preferred embodiment of the second configuration of the anti-skid armor according to the present invention.
Figure 32:
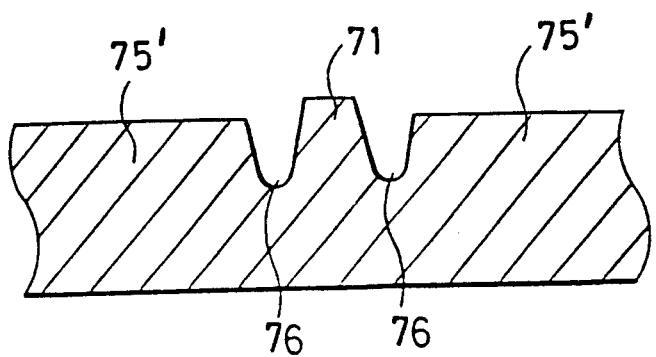
FIG. 32 is a cross-section showing another anti-skid feature.

FIG. 31 illustrates an example of an anti-skid device featuring a unit of the tread pattern.

This unit comprises a first zone I and a second zone II. The tread pattern in the second zone comprises a protrusion(s) 34 as previously set forth. The tread pattern in the first zone is hereinafter set forth.

The first zone comprises a anti-skid row 70, ridges 71, and driving row 72 used for tires in general. The tread pattern shown in FIG. 31 has its feature in the combination of a second zone comprising protrusions 34 (resilient ridge 73 hereinafter) and a first zone comprising ridges 71.

The function of the second zone is as above set forth. The anti-skid row 70 in the first zone I is described hereinafter.

The anti-skid row 70 prevents axial skidding of the tire (hereinafter denoted as "tire" understood to include anti-skid armor).

The tread evacuates snow, which is taken into the tread, out opposed sides of the tire as the tire runs on a road covered with snow. When the tire rotates at high speed, the tread contacts the road prior to the evacuation of the snow and the tire runs on the snow left unevacuated. This causes skidding on the layer of snow between the road and the tire. In order to avoid this phenomenon, an anti-skid row at the axial center of the tread is for-med to take in snow into the central cavity and stabilize the tread surface of the tire.

The anti-skid row 70 according to the present invention is provided with many cavities 74 to stabilize the tread surface by retaining snow therein. If only a relatively large cavity 74 was formed in the center of the tire, it would cause bending of the tire surface. Therefore, treads 75 are preferably provided in the anti-skid row 70 with comparatively large spacings therebetween. The shape of the tread 75 may be a rectangle shown in FIG. 31, a circle, a diamond, or any shape.

Next, the row of ridges 71 provided on both sides of the above-mentioned anti-skid row 70 is set forth hereinafter.

The ridge 71 is a projection between the treads 75' sticking out above the road contact surface defined by the tread 75'. The sub groove 76 is a little less shallow than the main groove 77 which form the anti-skid row 70 (see FIG. 33). If the sub groove 76 is deepened, the gripping force and repulsive force of ridge 71 is reduced.

The bottoms of the ridge 71 and sub groove 76 may preferably be tapered to a comparatively greater radius.

The longitudinal length or the width of the ridge 71 and the sub groove 76 are preferably about the same. And the ridge 71 is preferably not extremely wide and about 4 mm to 6 mm at the top is most desirable. A narrower design may result in weak gripping force and a wider design in less durability due to its lack of compliance.

The ridge 71 expands and contracts with. its tip trembling from its elasticity and sticks into the road surface only upon starting and braking. Therefore, it is desirable that the ridge be wide across the bottom, sufficiently strong, having upward repulsive force, and not be susceptible to excessive lateral trembling.

Figure 33:
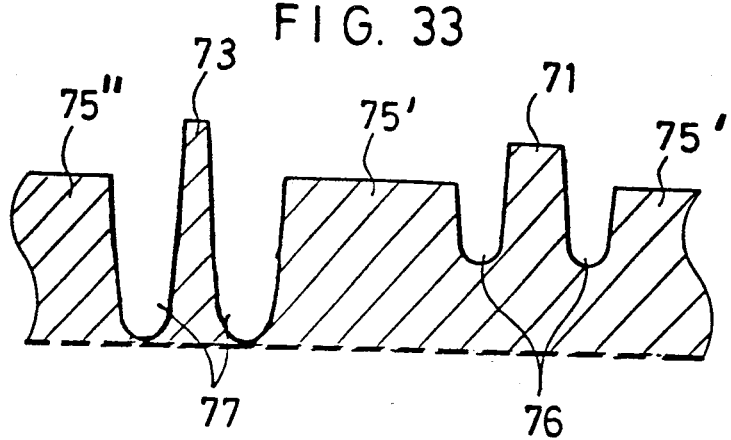
FIG. 33 is a cross-section showing yet another anti-skid feature.
Figure 34:
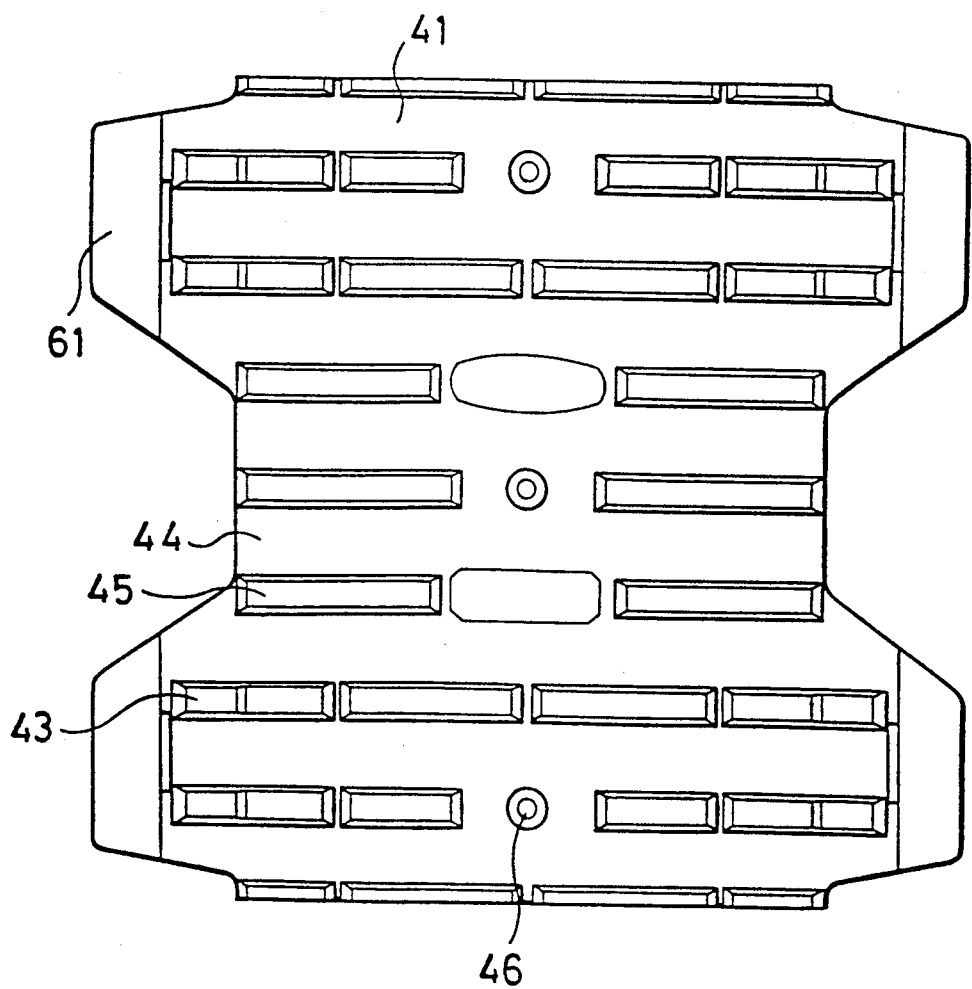
FIG. 34 is a partial cross-section showing another embodiment of the flexible surface of anti-skid armor of the present invention.

In order to achieve this, as shown in FIG. 33, the ridge 71 is formed so that its height is less than that of the resilient ridge 73 and its width is greater than that of the resilient ridge 73.

The ridges 71 formed in the anti-skid row 70 neighboring the both walls and the tread 75' are running in the same direction at an angle. The angle serves as a mark to distinguish tires from each other and presents an edge to avoid lateral sliding.

Further, the main groove 77 and the sub groove 76 are connected to aid in instantaneous evacuation of snow, ice, and dirt taken therein.

Next, a preferred embodiment of an anti-skid device having the second configuration is set forth hereinafter referring to figures.

The anti-skid device, as shown in FIG. 31, comprises rubber composite 2 with a lip 61 and is the same as the one shown in FIG. 1. The rubber composite 2 comprises a first rubber layer 3 defining the outer surface and a second rubber layer 4 defining the back surface.

A feature of the anti-skid device having the second configuration according to the present invention is the shape of the lip 61. A plurality of lips 61 is provided at opposite edges protruding out of the rubber laminate, extending circumferentially and uniformly spaced apart.

The lip 61 serves as means to secure the tire belt 1 all along the circumferential tread 171 of the tire 17, fastening the anti-skid device 1 inwardly toward the rotational axis of the tire.

FIG. 31 illustrates a preferred embodiment for the lip 61. The figure shows the lip unbent to aid in understanding.

When applied to a tire, the lips 61, 61 are bent inwardly toward the rotational axis of the tire 17 and are capable of holding the tire 17 on opposite sides.

Each lip 61 is provided with a hole 65 or the like to be hooked with the corresponding securing member.

The tip of the lip 61 is tapered so that the lip can bend to fit the arc of the tire 17 when being fastened toward the rotational axis of the tire. In other words, the flexible surface 41 and the tread 171 closely contact each other.

It is noted that the shape of the lip 61 is not limited to the one described above.

The first rubber layer 3, defining the surface of rubber composite 2, is provided with a tread pattern. Preferred embodiments of the tread pattern have already been described in detail referring to FIG. 31.

The second rubber layer 4, defining the back surface of the rubber composite 2, is provided with a flexible surface 41 to fit the tread 171 of the tire 17 whereon the anti-skid device 1 is secured. The flexible surface 41 may preferably be provided with many independent protrusions 46 at the axial center of the tread formed as independent round-top protrusions. The height of the protrusion is about the same as the level of the tire-engaging portion 45 shown in FIG. 3.

By forming many independent protrusions in combination with lateral grooves 44 and flexible surface 45, which are shown in FIG. 3 and described in connection with an anti-skid device having the first configuration, displacement of the anti-skid device during operation can be reduced and immediately restored.

When an anti-skid device according to the present invention having the second configuration is applied to the front wheels of an FF vehicle, the independent protrusions 46 prevent lateral displacement upon hard cornering and circumferential displacement on hard braking or starting to a minimum.

The independent protrusions 46 also aid in dissipating heat efficiently while running on a normal road where the asphalt surface is warmed by the sun and the temperature of the tire tends to rise accordingly. The heat generated by friction between the anti-skid device and the tire can be dissipated as well.

The flexible surface 41 may preferably be formed with a plurality of protrusions 43 along its axially opposed edges for abutting against shoulders 172 of the vehicle tire 17. The protrusion 43 has the same detail as the one described in connection with the anti-skid device having the first configuration shown in FIG. 4.

Each rubber layer is made from the same material described in connection with the tire belt having the first configuration according to the present invention. The total thickness is also the same.

Figure 35:
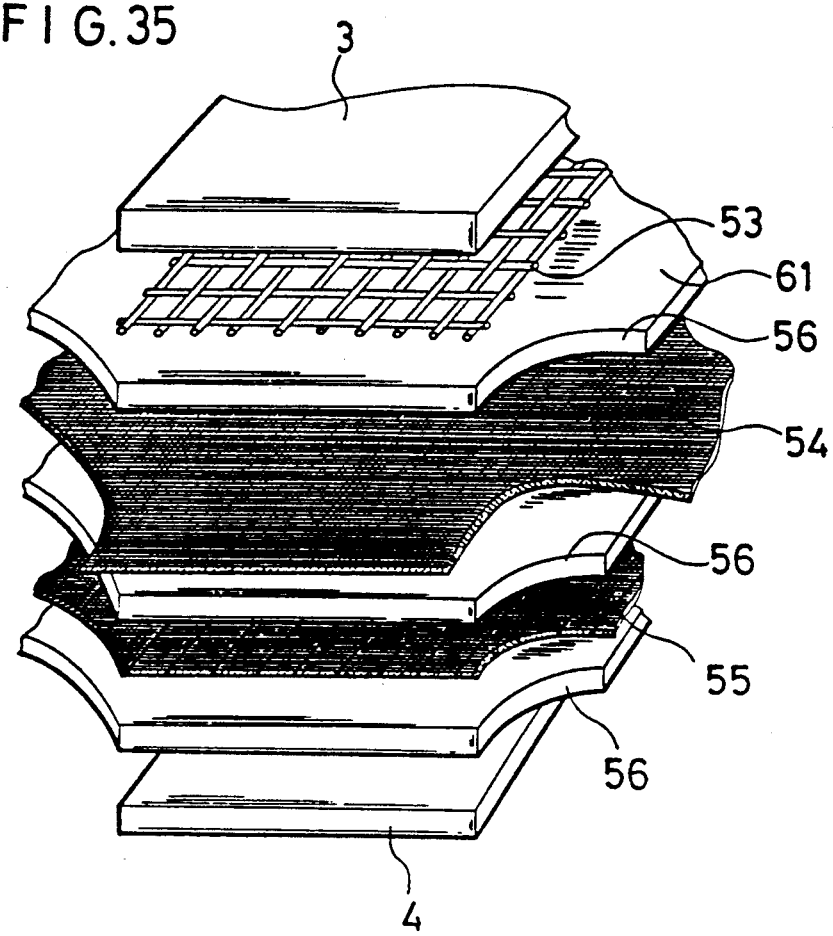
FIG. 35 is an exploded view showing the inner structure of the rubber laminate of the belted tire according to the second configuration.

The rubber composite 2 may preferably comprise, as shown in FIG. 35, at least a mesh layer 53, a sailcloth-like layer 54, a fiber network layer 55, between the first rubber layer 3 (top surface of the rubber layer 2) and the second rubber layer 4 (back surface of the rubber layer 2).

A plurality of thin, lateral threads and a plurality of thick longitudinal threads 1 mm to 1.5 mm in diameter formed of twisted strands are woven into a mesh defining the mesh-like layer. When manufactured, the anti-skid device is adhered to the rubber layer with an adhesive agent for rubber and fiber such as Kemlock 402. Being vulcanized, the rubber fuses into the mesh and aids in sticking the layers together.

Sailcloth-like layer 54 comprises a woven layer resembling sailcloth.

The fiber network layer includes many fibers extending longitudinally preventing longitudinal distortion of the anti-skid device. The fibers may be amorphous, ceramic, carbon, piano wire or the like. The warp yarn of a plain weave form a belt-core-like network, increase the strength of the laminate and increase the strength of the bond to the rubber.

Figure 36:
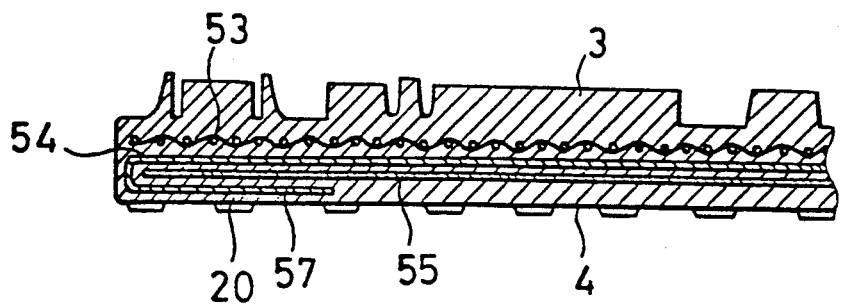
FIG. 36 is a cross-section showing the configuration of the edge of the rubber laminate of an anti-skid device according to the second configuration.

As shown in FIG. 36, at least one of the mesh-like layer 53, sailcloth-like layer 54 and fiber network layer 55 may be bent back over at the edges of the anti-skid device and be pressed and adhered therein during the vulcanization/shaping of the rubber composite 2 to form a reinforcing layer 57.

Figure 37:
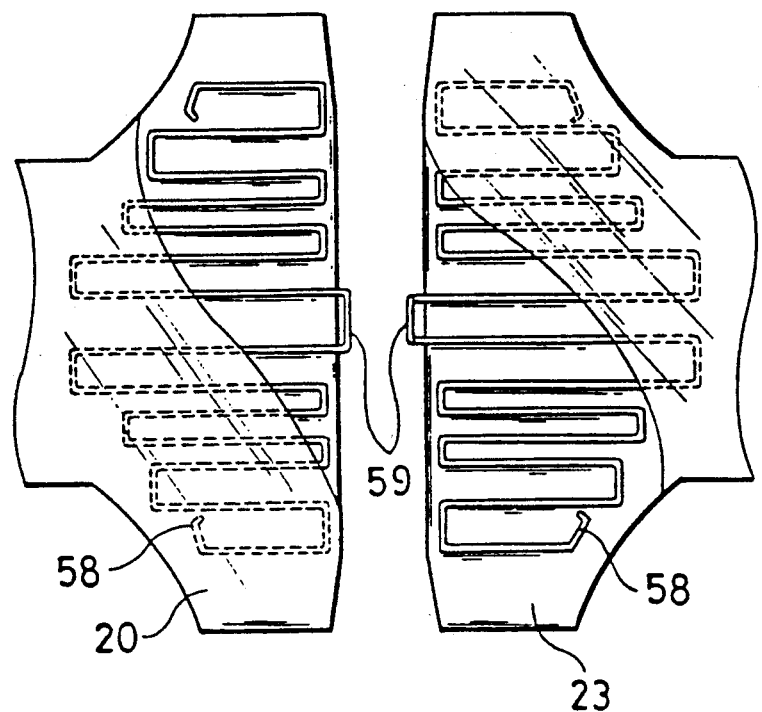
FIG. 37 is a diagram showing the reinforcing member which also functions as a fastening means on both sides of the laminate layers of the anti-skid device of the second configuration.

More preferably, opposed ends of the anti-skid device may include a reinforcing member 58 shown in FIG. 37. Any material which increases the mechanical strength of the end 20 of the rubber laminate of the anti-skid device may be utilized for the reinforcing member 58. The spring wire bent into a shape resembling that of the end of the rubber laminate and being embedded into the rubber may be utilized as a reinforcing member. Moreover, a portion of this reinforcing member 58 preferably protrudes from the end 20 of the rubber laminate and functions as locking means 59 hereinafter described.

Upon fitting the anti-skid device 1 around tire 17, it is connected by the locking means 59.

Any form of locking means 59 may be used as long as it connects the opposed ends of the belt with some clearance after connecting the ends of the anti-skid device with connecting means hereinafter described.

Figure 38:
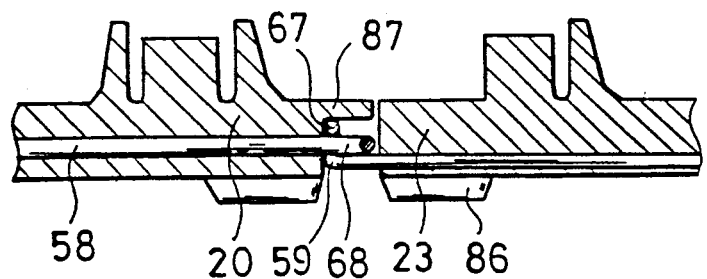
FIG. 38 is a cross-section showing the fastening means fastening both sides of the laminate layer.

FIGS. 37 and 38 illustrate an example of the locking means 59. The locking means 59 shown in FIGS. 37 and 38 constitutes part of reinforcing member 58 which protrudes from the end 23 of the rubber laminate to form a rectangle and the edge of which bends orthogonally against the tread 25 of the anti-skid device to form a hook. A portion of the other reinforcing member included in the other end 20 of the rubber laminate also protrudes to form a rectangle having a hole therein so that it can be hooked by the hook protruding from end 23.

Such a locking means 59 preferably is not exposed at either surface. For example, as shown in FIG. 38, covering means 87 and protecting means 86, which are formed at the ends of the rubber laminate, cover the locking means 59 and improve the durability of the locking means 59 during driving especially long drives.

Figure 39:
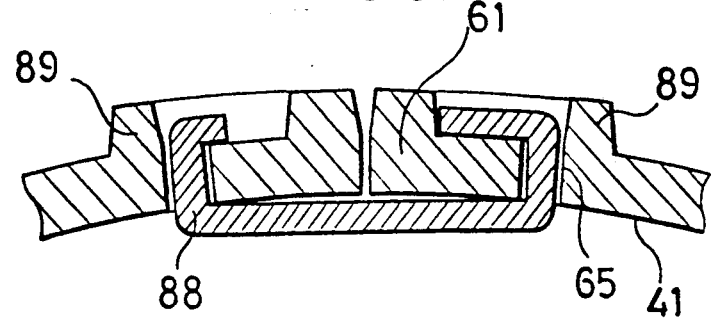
FIG. 39 is a cross-section showing lips connected by the coupling means.

After fitting the anti-skid device 1 on the tire 17, two lips positioned on the ends of the rubber laminate 2 are connected tightly by the connecting means as shown in FIG. 39. In the embodiment of FIG. 9 the connecting means is a rod-shaped member 88 both ends of which are bent and are inserted in holes 65 of lips 61 to connect the lips.

It is preferable to provide protection around the hole 65 of the lip 61 to avoid defacing of the end of the rod-shaped member 88 inserted in the hole 65.

The anti-skid device 1 is securely mounted around tire 17 with a fastening means which pulls the lips inwardly toward the rotational axis of the tire when fitted to the tire 1.

The fastening means may comprise fastener 10 disposed on the outer side of a wheel, partially illustrated in FIGS. 9 and 10, and a linkage 16 disposed on the inner side of the wheel (shown in FIGS. 11 and 12).

Figure 14:
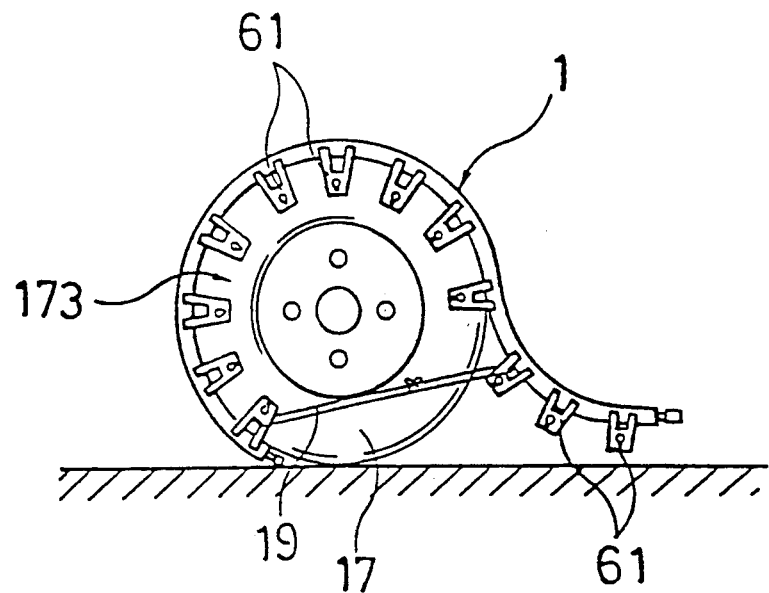
FIGS. 14, 15, 16 and 17 illustrate attachment of the anti-skid armor onto a vehicle tire.
Figure 15:
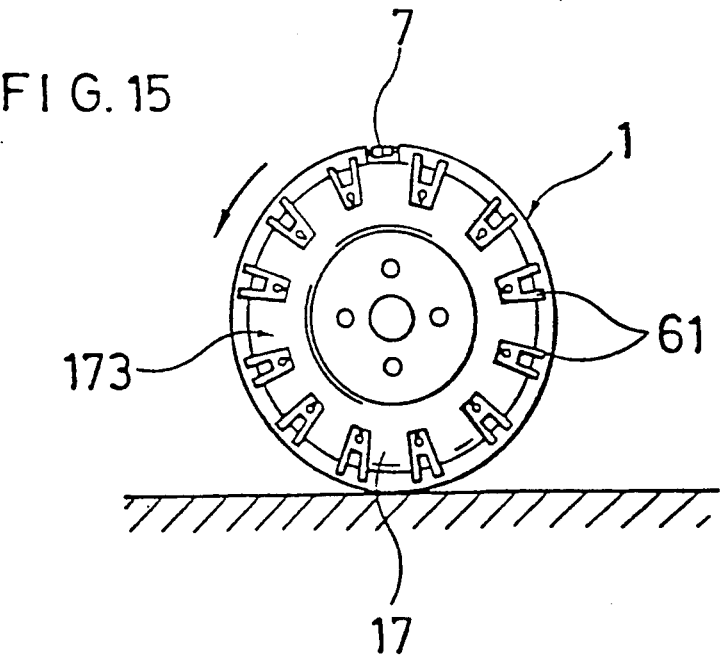
Figure 16:
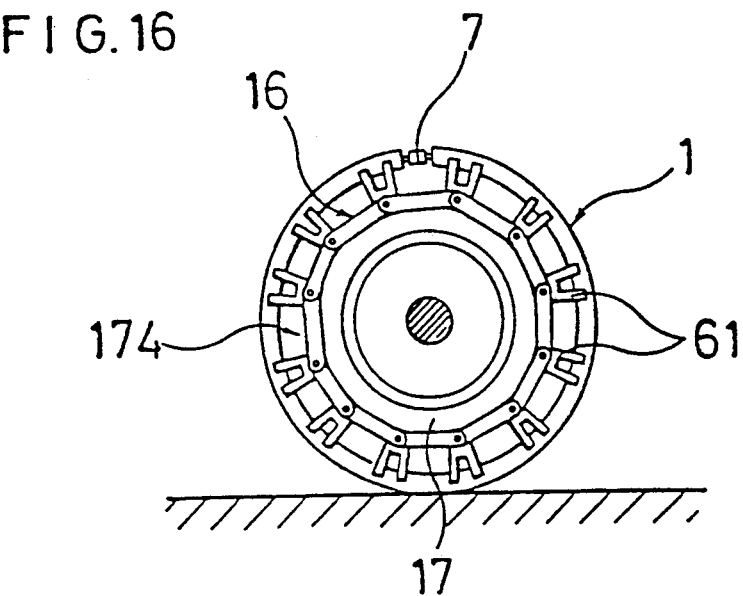
Figure 17:
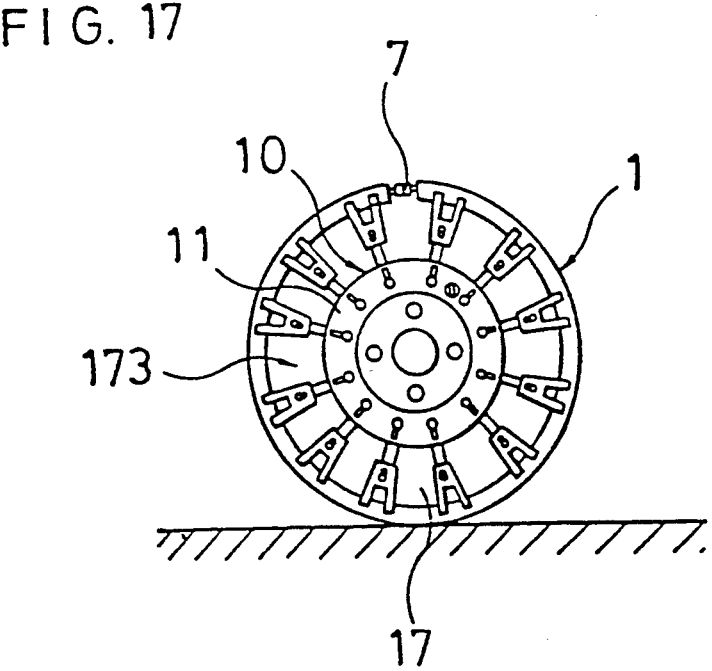

The securing of the anti-skid device according to the present invention onto the vehicle tire 17 is hereinafter set forth referring to FIGS. 14 through 17. FIGS. 14, 15 and 17 are views taken from outer side of the wheel, and FIG. 16 is from inner side of the wheel.

Referring to FIG. 14, the anti-skid device I is placed over upper part of the vehicle tire 17. The anti-skid device 1 is temporarily held in place by a band 19 between two lips 61.

The vehicle tire 17 is then turned counterclockwise until the opposing ends of the anti-skid device 1 or the coupling means 7 are substantially at the top of the vehicle tire 17, as shown in FIG. 15. The male and female members 8 and 9 are coupled and tightened as set forth above by means of the tool 84 for close contact between the flexible surface 41 and the tire tread 171. Preferably, two fastening belts 5 are alternately tightened so that the two belts are equally tightened for identical tension.

In the second configuration, as shown in FIG. 38, a hook member 67 and a hook hole member 68 constituting a locking means 59 are hooked to each other. Next, the lips of the opposed ends of the anti-skid device 1 are fitted by the coupling means 88. Here, the locking means 59 is applied to leave some clearance or play as shown in FIG. 39.

Next the linkage 16 is mounted on the inner side 174 of the vehicle tire 17, as shown in FIG. 16. The catches 163 are serially inserted through the slots 65 of the corresponding lips 61 by appropriately pivoting the link 161 of the linkage 16 from the starting end 164 to the finishing end 165. The starting and finishing ends 164 and 165 are engaged with the same lip 61 to complete the annular linkage 16. It is to be noted that this is a simple groping process carried out by slipping hands into the inner side 174 of the wheel through a gap or opening between the tire 17 and the fender (not shown).

At the stage when the attachment of the linkage 16 on the inner side 174 of the vehicle tire 17 is completed, tension is applied onto the lips 61 only on the inner side 174 of the vehicle tire 17. However, anti-skid device is not displaced because the fastening belts 5 securely fasten the tire belt 1 in close contact with the flexible surface 41 with the tire tread 171. Tension on the lips 61 at the inner side of the tire 17 is subsequently balanced by pulling the lips 61 at outer side of the tire with the fastener 10, to thereby secure close contact between the flexible surface 41 and the tread 171 of the vehicle tire 17.

The lips 61 on the outer side 173 of the vehicle tire 17 are pulled toward the center of the tire 17 by the fastener 10 as described hereinafter.

As illustrated in FIG. 9, the catches 131 of the sliding members 13 mate with the slots 65 of the corresponding lips 61. The cable 15 is then wound by the take up unit 12 to translate sliding members 13 along the elongated slots 112, thereby pulling the lips 61 inwardly toward center of the tire 17. In the fastener 10, a substantially equal tension is exerted throughout the cable 15 by function of the pulleys 141, 142 and 143, and consequently, a substantially uniform stress is applied onto the lips 61. The anti-skid device is thus securely fixed over the tire 17.

Since the sliding members 13 extend through the slits 113 formed at regular intervals on the radially outer circumference of the ring member 11, the distances between the adjacent sliding lips 13, that is the distances between adjacent lips 61, remain constant. Therefore, the relative positions of the securing members 6 are not changed in operation even during acceleration or deceleration.

The fixing of the anti-skid device 1 over the vehicle tire 17 is completed by the above-described procedure. The anti-skid device 1 may be removed from the tire 1 by carrying out the procedure in reverse.

For a two-wheel drive vehicle, it is sufficient to mount anti-skid devices according to the present invention on the driving wheels (front or rear wheels) although they may be mounted on all of the four wheels. For a four-wheel drive vehicle, the anti-skid devices may be mounted on the front and/or rear wheels.

The behavior of the anti-skid device 1 during operation on vehicle tire 17 is hereinafter set forth.

The tire contour differs as between the road-engaging portion and the remaining portion of the tire even during straight driving at a constant speed. Various stresses are exerted on the tire in axial and circumferential directions, particularly during acceleration, deceleration and cornering. Stresses applied onto the tire 17 and the deformation of the tire due to the stresses become augmented and complicated on snow, mud or rough road. It is necessary that the anti-skid device 1 be securely fixed over the tire 17 to avoid displacement and disengagement under such adverse conditions.

The anti-skid device according to the present invention is circumferentially tightened over the tread 171 of the vehicle tire by two or more fastening belts 5. Therefore, the anti-skid device is not likely to be displaced even at a high velocity. If one fastening belt 5 should be instantaneously loosened due to an axially uneven deformation of the vehicle tire 17, as in cornering, the other fastening belt 5 firmly holds the anti-skid device 1 in place until the loosened belt is retightened.

The anti-skid device according to a second configuration of the present invention enables a lengthy drive without displacement even at a high velocity, because of provision of a fiber network layer 55 and provision of a reinforcing member 58, a portion of which also functions as longitudinal locking means 59.

The anti-skid device 1 is brought into close contact with the tread 171 of the tire 17 throughout its circumference by means of a plurality of securing members 6 which axially secure the anti-skid device 1. An axial displacement of the tire is thus avoided even under the adverse conditions as mentioned above. Particularly, the protrusions 53 along axially opposed edges of the flexible surface 41 of the tire belt 1, if provided, prevent axial displacement of the tire belt 1 with certainty by abutting against the shoulders 72 of the vehicle tire 17.

The tread pattern including a first zone 31, as described above, provides good traction to allow safe operation on snow, mud, sand, gravel and the like as well as on normal pavement. When first and second zones 31 and 32 are alternately disposed around the circumference of the anti-skid device 1, the second zone 32 prevents slipping in the road engaging portion of the first zone 31 to enhance driving safety.

The anti-skid device 1 according to the present invention may be used on normal pavement as well as on hazardous surfaces exemplified by snow, and there is no need to put on and take off the anti-skid device to cope with changing road conditions such as presence/absence of the snow on roads.

In the second configuration in the present invention, the tread pattern comprises a plurality of units each having a first zone and a second zone at either side of the first zone, and the first zone having a cavity 74 positioned adjacent the axial center for receiving therein snow, dirt and sand and the like and a circumferential ridge 71 at both sides thereof, the second zone having a transverse resilient ridge 73 positioned adjacent the axial center of the tire.

The cavity 74 holds and then expels packed snow when the tire rotates at higher speeds, rather than push the snow aside of the tire, thus preventing pushed-aside snow from causing slipping.

Also, the specific tread pattern formed by the ridges 71 in combination with the resilient ridge 73 heightens the prevention of the slippage on icy snow or wet road and heightens the running performance when starting or braking.

Recognizing the difference in road conditions as between ice and snow, the relative ratio of areas in the tread pattern may be changed according to the application of use to further heighten the running performance.

Further, the anti-skid device 1 of the present invention has an improved durability. The rubber laminate 2 is imparted with a particularly improved strength when reinforcing member 22 is embedded in the rubber laminate 2.

I claim:

1. A tire tread when on a circumference of a vehicle wheel comprising a plurality of tread members defining a primary road contact surface and a plurality of cavities recessed from said road contact surface for receiving and expelling snow, dirt or sand;

said tire tread having a first zone and a second zone at either side of said first zone with transverse recessed gaps separating said second zones from said first zone;

said first zone comprising a central anti-skid zone and at least two driving rows disposed axially outward, on opposite sides of said anti-skid zone;

said anti-skid zone comprising a circumferentially-extending hollow, said hollow being divided into said plurality of cavities (74) by first transverse tread members (75) interpositioned therein, each of said cavities having a circumferential width larger than one of said first transverse tread members;

said driving row providing a driving function on normal paved roads and having a plurality of driving tread members (75′) and a plurality of ridges (71) interposed between said driving tread members, each of said ridges extending transversely and having an end protruding radially beyond said driving tread members; and said second zone having at least one second transverse tread member (75″) and at least one elongated resilient lug (73) associated with each second transverse tread member, each elongated resilient lug being in close proximity to, parallel to and narrower in the circumferential direction than the associated second transverse tread member, said elongated lug protruding radially beyond the associated second transverse tread member so as to bend over an edge of the associated second transverse tread member and to wedge between the associated second tread member and a road surface upon braking or starting.

2. The tire tread of claim 1 wherein said first and second zones and said recessed gaps extend completely across said road contact surface.

3. The tire tread of claim 1 wherein a pair of said elongated lugs (73) is associated with each second transverse tread member (75″), one elongated lug being located on each side of the associated second transverse tread member.

4. The tire tread of claim 1 wherein four of said elongated lugs (73) are associate with each second transverse tread member (75″), two of said lugs being located on each side of the associated second transverse tread member.

5. The tire tread of claim 1 wherein said first and second transverse tread members (75, 75") are at a right angle to the circumference of the tread.

6. The tire tread of claim 1 wherein said first transverse tread members (75) do not extend across the entire width of said hollow, thereby leaving gaps spacing said driving tread members (75') from each end of each of said first transverse tread members.

7. The tire tread of claim 1 comprising inner (75') and outer (72) rows of driving tread members on each side of said anti-skid zone (70), said plurality of ridges (71) being interposed between driving tread members in said inner rows (75'), said ridges (71) being separated from the driving tread members of said inner rows by first grooves (76) in the road contact surface and said driving tread members in said outer rows (72) being separated by second grooves in the road contact surface, said first grooves being significantly more shallow than said second grooves.

8. The tire tread of claim 7 wherein said second grooves are equal in depth to said cavities.

9. A tire tread when on a circumference of a vehicle wheel comprising a plurality of tread members defining a primary road contact surface and a plurality of cavities recessed from said road road contact surface for receiving and expelling snow, dirt or sand;

said tire tread having a first zone and a second zone at either side of said first zone with transverse recessed gaps separating said second zones from said first zone;

said first zone comprising a central anti-skid zone and at least two driving rows disposed axially outward, on opposite sides of said anti-skid zone;

said anti-skid zone comprising a circumferentially-extending hollow, said hollow being divided into said plurality of cavities (74) by first transverse tread members (75) interpositioned therein, each of said cavities having a circumferential width larger than one of said first transverse tread members;

said driving row providing a driving function on normal paved roads and having a plurality of driving tread members (75') and a plurality of ridges (71) interposed between said driving read members, each of said ridges extending transversely and having an end protruding radially beyond said driving tread members;

said second zone having at least one second transverse tread member (75") and at least one elongated resilient lug (73) associated with each second transverse tread member, each elongated resilient lug being in close proximity to, parallel to and narrower in the circumferential direction than the associated second transverse tread member, said elongated lug protruding radially beyond the associated second transverse tread member; and each elongated resilient lug being separated from the associated second transverse tread member by a first groove and from the first zone by the respective transverse recessed gap;

said ridges being wider in the circumferential direction than said elongated resilient lugs and being separated from the driving tread members by second grooves; and said second grooves being significantly more shallow than said first grooves.

* * * * *